(12) United States Patent
Yoshida

(10) Patent No.: US 7,093,947 B2
(45) Date of Patent: Aug. 22, 2006

(54) MIRROR DEVICE FOR VEHICLE

(75) Inventor: Shigeki Yoshida, Aichi-Ken (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 0 days.

(21) Appl. No.: 11/062,633

(22) Filed: Feb. 23, 2005

(65) Prior Publication Data

US 2005/0141111 A1    Jun. 30, 2005

Related U.S. Application Data

(62) Division of application No. 10/098,529, filed on Mar. 18, 2003, now Pat. No. 6,874,896.

(30) Foreign Application Priority Data

| Mar. 19, 2001 | (JP) | ............... 2001-79505 |
| Mar. 19, 2001 | (JP) | ............... 2001-79506 |
| Mar. 19, 2001 | (JP) | ............... 2001-79507 |

(51) Int. Cl.
*G02B 5/08* (2006.01)

(52) U.S. Cl. ................ 359/841; 359/877

(58) Field of Classification Search ........... 359/841, 359/872, 877; 248/476, 479
See application file for complete search history.

(56) References Cited

U.S. PATENT DOCUMENTS

| 5,005,797 A | 4/1991 | Maewkawa |
| 5,190,499 A | 3/1993 | Mori et al. ............ 464/36 |
| 5,210,651 A | 5/1993 | Shibuya et al. |
| 5,313,336 A | 5/1994 | Sakao et al. ............ 359/841 |
| 5,639,054 A | 6/1997 | Gerndt et al. |
| 5,781,354 A | 7/1998 | Sakata ............ 359/841 |
| 5,828,504 A | 10/1998 | Beuzeville ............ 359/841 |
| 6,022,113 A | 2/2000 | Stolpe et al. |
| 6,130,514 A | 10/2000 | Oesterholt et al. |
| 6,132,050 A | 10/2000 | Sakata et al. ............ 359/841 |
| 6,672,726 B1 | 1/2004 | Boddy |

FOREIGN PATENT DOCUMENTS

| AU | 728475 | 12/1998 |
| EP | 0 402 465 A1 | 12/1990 |
| EP | 0-440-819 A1 | 8/1991 |
| FR | 2-723-897 | 3/1996 |
| JP | 0 551 607 A1 | 7/1993 |
| WO | WO-00/41914 | 7/2000 |

OTHER PUBLICATIONS

European Search Report Dated May 4, 2004.
European Search Report dated Aug. 30, 2004, for Application No. EP-02-00-5994.

*Primary Examiner*—Mark A. Robinson
(74) *Attorney, Agent, or Firm*—Thomas W. Cole; Nixon Peabody LLP

(57) ABSTRACT

A foldable mirror device for a vehicle, in which a case is mounted on a support shaft erected from a base. The case includes a ring-shaped support portion for supporting the shaft, a motor connected to a transmission for swinging the mirror, and a clutch portion for disengageably engaging with the base. The support portion can be strengthened by ribs between the support portion and other portions of the case. A worm gear of the transmission can be mounted on a motor output shaft to be freely movable therealong, and supported and constrained by supporting a bottom end of the worm gear on the case and accommodating an upper end of the worm gear in a cylindrical projection from a motor base which supports the motor. End portions of convexities and concavities at the engagement portion can be formed in a concave or convex screw shape.

11 Claims, 21 Drawing Sheets

MIRROR DEVICE FOR VEHICLE

BACKGROUND OF THE INVENTION

1. Field of the Invention

The present invention relates to a mirror device for a vehicle.

2. Description of the Related Art

PRIOR ART 1

In a mirror device for a vehicle, such as an electrically powered housable-type door mirror device, a mirror stay is fixed to a side of the vehicle body so as to extend in a substantially transverse direction from the vehicle, and a mirror main body portion is supported by the mirror stay such that the mirror main body can swing between a housed position and a position for viewing. This type of conventional door mirror device 100 is illustrated in FIGS. 18 to 21 and a brief description thereof follows.

As illustrated in FIG. 18, a stand 104 whose axial direction is a substantially vertical direction of a vehicle, is fixed on a mirror stay 102 which is fixed at a side of the vehicle. An electrically powered housing unit 106 is provided on the rotation shaft 104A of the stand 104, so as to be rotatable about the axis of the shaft. A mirror main body portion 110 comprising a mirror 108 and the like is connected to and supported by the electrically powered housing unit 106.

When a driving motor inside the electrically powered housing unit 106 operates, it works to rotate a gear plate 112 (See FIG. 20), which is axially supported by the rotation shaft 104A, via a gear mechanism. However, the gear plate 112 is always held so that it does not rotate with respect to the rotation shaft 104A. Thus, the electrically powered housing unit 106 itself rotates around the rotation shaft 104A. Since the mirror main body 110 is connected to and supported by the electrically powered housing unit 106, the mirror main body 110 rotates, along with the electrically powered housing unit 106, between the housed position and the position for viewing.

The schematic structure of a case 114, which forms the exterior of the electrically powered housing unit 106, will be described with reference to FIGS. 19 and 20.

FIG. 19 shows a schematic plan view of the case 114, which forms the exterior of the electrically powered housing unit 106 in the door mirror device 100. FIG. 20 shows a longitudinal section view of the case 114. A cylindrical support shaft portion 116 is erected at the left side, in the drawing, of the top surface of the case 114, and a circular concave portion 118 is formed around the support shaft portion 116. The rotation shaft 104A of the stand 104 is inserted inside the support shaft portion 116, and the case 114 is axially supported by the rotation shaft 104 so as to be rotatable. In addition, the gear plate 112, which applies anti-drive force to the electrically powered housing unit 106 and the mirror main body 110, is held so as to be fixed at the top end side of the support shaft portion 116.

In the electrically powered housing unit 106 having the above-described structure, the load of the electrically powered housing unit 106 and the mirror main body 110 must be supported by the support shaft portion 116 of the case 114. However, the strength of the support shaft portion 116 of the case 114 may be insufficient. Thus, external forces such as vehicle vibrations act on the door mirror device 100 and, as indicated by the arrow in FIG. 21, the mirror main body 110 vibrates in a substantially longitudinal direction of the vehicle, about a center in the vicinity of the support shaft portion 116 (the vicinity of the base of the stand 104). In order to limit this type of vibration, increasing the rigidity of the support shaft portion 116 has been considered. In order to do this, the plate thickness of the case 116 and/or the bottom portion 114A of the case 114 can be increased, thereby reinforcing the case 114. However, if this is done, there is the possibility that problems will be caused such as the generation of shrinkage and warping on a surface of the mirror. Also, it may be necessary to increase the number of cycles in the production process, leading to increased production costs.

PRIOR ART 2

Door mirror devices are usually equipped with a housing mechanism, and the housing mechanism includes a stand which is fixed to the vehicle side. The stand is provided so as to be integral with a support shaft.

The housing mechanism is equipped with a case member, and the case member is supported by the support shaft so as to be rotatable. The case member is connected to a mirror for viewing the rear of the vehicle and the case member always swings together with the mirror.

A motor base is fixed in an inner portion of the case member and a motor is fixed to the upper side of the motor base by screws. A motor output shaft passes through the motor base, and a worm gear is press-inserted onto the motor output shaft through the lower side of the motor base. As a result, the worm gear is swung by the motor being driven.

A helical gear meshes with the worm gear and the helical gear is rotated by the rotation of the worm gear. Thus, a rotational force is applied to the support shaft and the case member is rotated by anti-rotational force. The mirror can thus be housed or swung out for viewing.

However, with this type of door mirror device, the worm gear is press-inserted onto the motor output shaft, and is not movable in an axial direction with respect to the motor output shaft. As a result, there is a problem that the motor output shaft receives a sliding force from the worm gear, and this reduces the life span of the motor.

In order to solve this problem, door mirror devices are provided in which the motor output shaft and the worm gear are separate, and the worm gear is not rotatable with respect to the motor output shaft, but is movable in the axial direction thereof.

However, in this type of device, there is a tendency for the worm gear to displace in a perpendicular direction with respect to the motor output shaft. As a result, the sound of the operation between the worm gear and the helical gear becomes very loud and in some cases the worm gear may skid.

PRIOR ART 3

Further, in the door mirror device described above, the stand has a pair of stand concavities which are provided on a circle having the support shaft at the center thereof. The respective end portions of the stand concavities project upwards and face each other.

A gear plate is rotatably disposed around the support shaft which rotatably supports the case member, and a rotational force is applied to the gear plate by the motor being driven. The upper surface of the gear plate is provided with insertion convexities, which project upwards.

A clutch plate is disposed around the support shaft above the gear plate, and the clutch plate is not rotatable with respect to the support shaft. Insertion concavities are provided at a lower surface of the clutch plate, and end portions of the insertion concavities project downwards. The insertion convexities of the gear plate are inserted into these insertion concavities and as a result, the clutch plate meshes with the gear plate.

A compression coil spring is penetrated by the support shaft above the clutch plate, and push nuts are fixed on top of the compression coil spring. The compression coil spring is anchored by the push nuts, and the compression coil spring urges the clutch plate.

A pair of case convexities, formed on a circle having the support shaft at the center thereof, are provided at a lower portion of the case member. Each of the case convexities projects downwards, and they face each other.

When a rotational force is applied to the gear plate by the motor being driven, the clutch plate blocks the rotation of the gear plate. As a result, the case member is rotated by anti-rotational force exerted at the gear plate, and the mirror swings in a housing direction or in a viewing direction. Also, when the end portions of the case convexities engage with the end portions of the stand concavities, the case member is anchored, and the mirror can be stopped at the housed position or at the position for viewing.

On the other hand, if an external force exceeding a predetermined value acts on the case member, the urging force of the compression coil spring is resisted and the insertion convexities are disengaged from the insertion concavities. By the gear plate and the case member swinging with respect to the clutch plate, impact of the force can be ameliorated and damage to the gear plate is prevented.

However, in this type of door mirror device, end portions of all of the case convexities, the stand concavities, the insertion convexities and the insertion concavities are inclined surfaces having an upper area and lower area which are co-planar with each other. As a result, when the end portions of the case convexities engage with the end portion of the stand concavities, if the case convexities and the stand concavities undulate, they are connected linearly. Also, when the insertion convexities are inserted into the insertion concavities, or when insertion convexities and insertion concavities are disengaged, if the end portion of the insertion convexities and the end portion of the insertion concavities undulate, the insertion convexities and the insertion concavities are connected linearly. As a result, the case convexities, the stand concavities, the insertion convexities and the insertion concavities become worn and the durability of the mirror device is poor.

Since two sets of the case convexities and stand concavities are arranged on the same circle, whose center is the support shaft, when the end portions of the case convexities are engaged with the end portions of the stand concavities, the pressure which both the case convexities and the stand concavities receive is large and thus durability is poor. Also, when the end portions of the case convexities are engaged with the end portions of the stand concavities, the case member may rattle on the stand and as a result the mirror also tends to rattle.

SUMMARY OF THE INVENTION

An object of the present invention is to provide a door mirror device in which vibration generated at a mirror main body portion can be effectively controlled without increasing plate thickness of a support shaft portion.

Another object of the present invention is to provide a mirror device for a vehicle in which the life span of a motor is extended and slipping of a worm gear in a perpendicular direction of a shaft is controlled.

Yet another object of the invention is to provide a mirror device for a vehicle, in which durability of case convexities and stand concavities is improved.

According to one aspect of the present invention, there is provided a folding-type mirror device for vehicle, the mirror device including: a support shaft including a base portion; a case installed on the support shaft, the case including a support portion disposed around an outer periphery of the base portion of the support shaft, a bottom portion from which the support portion projects, and at least one reinforcing rib integrally connecting an outer surface of the support portion with the bottom portion; and a mirror unit attached to the case and swingable around the support shaft, by rotation of the support portion around the support shaft, for positioning at positions including a viewing position and a folded position.

According to another aspect of the invention, there is provided and electrically powered folding mirror device for a vehicle, the mirror device including: a support shaft including a base portion; a case installed on the support shaft, the case including a fitting portion disposed around an outer periphery of the base portion of the support shaft; a mirror unit attached to the case and swingable around the support shaft, by rotation of the fitting portion around the support shaft, for positioning at positions including a viewing position and a folded position; a motor base attached inside the case; an electric motor mounted to the motor base and including a motor output shaft which penetrates the motor base; and a transmission mechanism provided inside the case, operationally connected to the motor output shaft, and including a worm gear connected with the motor output shaft so as to be moveable in an axial direction of the motor output shaft but not rotatable relative to the motor output shaft, the transmission mechanism acting to swing the case and mirror unit when the motor is operated.

According to still another aspect of the invention, there is provided a folding mirror device for a vehicle, the mirror device including: a stand; a support shaft extending from the stand and including a base portion; a case installed on the support shaft, the case including a fitting portion disposed around an outer periphery of the base portion of the support shaft; a mirror unit attached to the case, and swingable around the support shaft, by rotation of the fitting portion around the support shaft, for positioning at positions including a viewing position and a folded position; and a positioning mechanism at an interface of the stand and the case, the positioning mechanism including a plurality of convexities formed at the case and a plurality of concavities formed at the stand, the convexities being insertable into the concavities, and each convexity and each concavity including one end portion and another end portion, wherein the one end portions of the convexities are surface-contactingly engageable with the one end portions of the concavities for holding the case and the mirror unit at one of the viewing position and the folded position, and the another end portions of the convexities are surface-contactingly engageable with the another end portions of the concavities for holding the case and the mirror unit at the other of the viewing position and the folded position.

According to still another aspect of the invention, there is provided a folding mirror device for a vehicle, the mirror device including: a stand which is mountable to a vehicle body; a support shaft projecting from the stand and including a base portion; a case installed on the support shaft, the case including a fitting portion disposed around an outer periphery of the base portion of the support shaft; a mirror unit attached to the case, and swingable around the support shaft, by rotation of the fitting portion around the support shaft, for positioning at positions including a viewing position and a folded position; an electric motor disposed in the case and including a motor output shaft; and a transmission mechanism provided inside the case and operationally connected to the motor output shaft for acting to swing the mirror and case unit when the motor is operated, the transmission mechanism including a gear plate rotatably mounted to the support shaft and including a clutch plate fixed to the support shaft, the clutch plate being capable of blocking relative rotation of the support shaft and the gear plate and capable of allowing relative rotation of the support shaft and the gear plate, wherein one of the gear plate and the clutch plate includes insertion convexities and the other includes insertion concavities into which the insertion convexities are surface-contactingly fittable for the blocking of relative rotation.

The foregoing and other objects, features and advantages of the present invention will be apparent from the following description of preferred embodiments of the invention, as illustrated in the accompanying drawings.

DETAILED DESCRIPTION OF THE PREFERRED EMBODIMENTS

First Embodiment

An electrically powered housable-type door mirror device 10 according to a first embodiment of the present invention will be described with reference to FIGS. 1 to 5.

Figure 5:
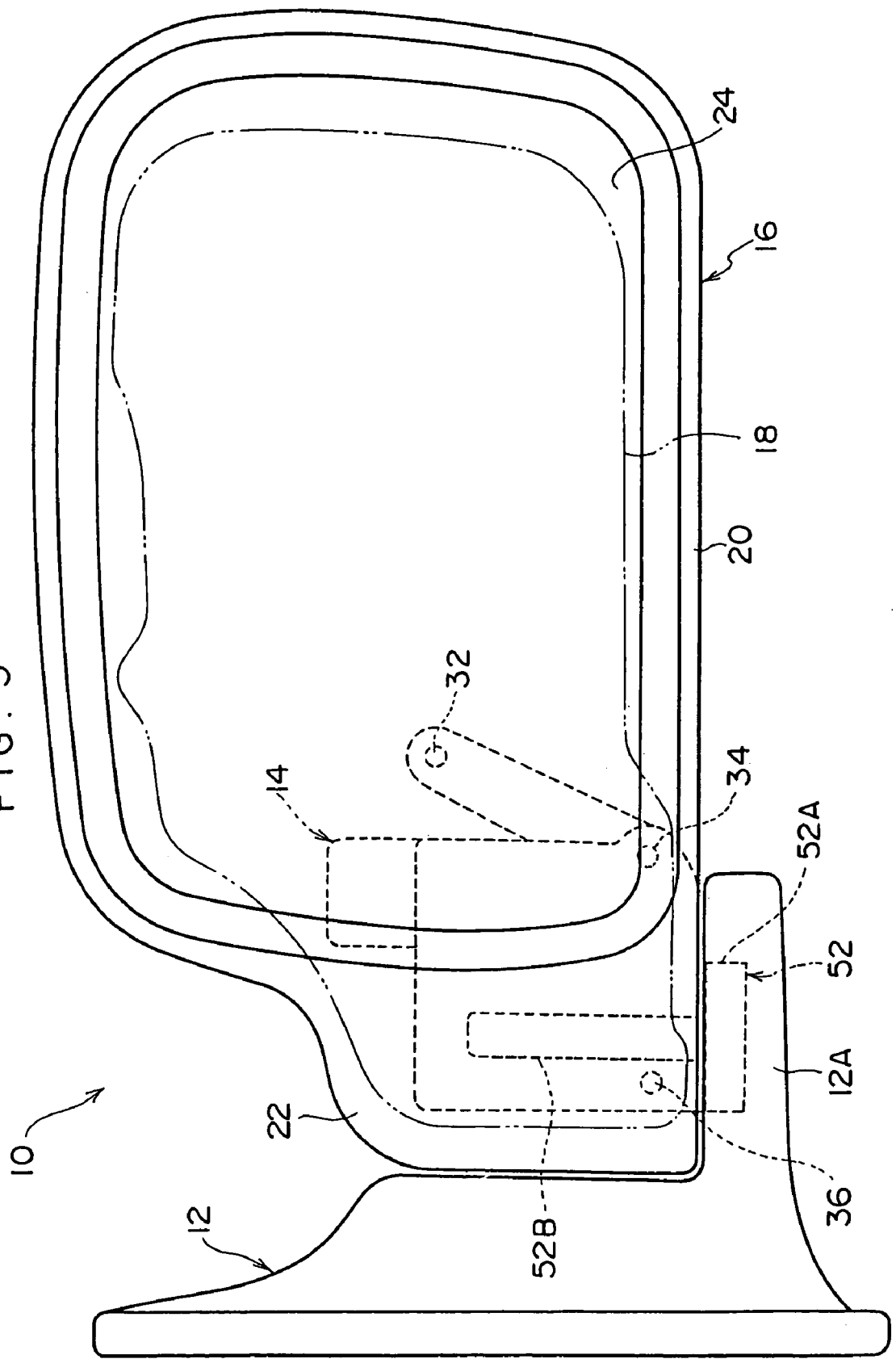
FIG. 5 is a front view outlining overall structure of the door mirror device according to the first embodiment of the present invention.
Figure 6:
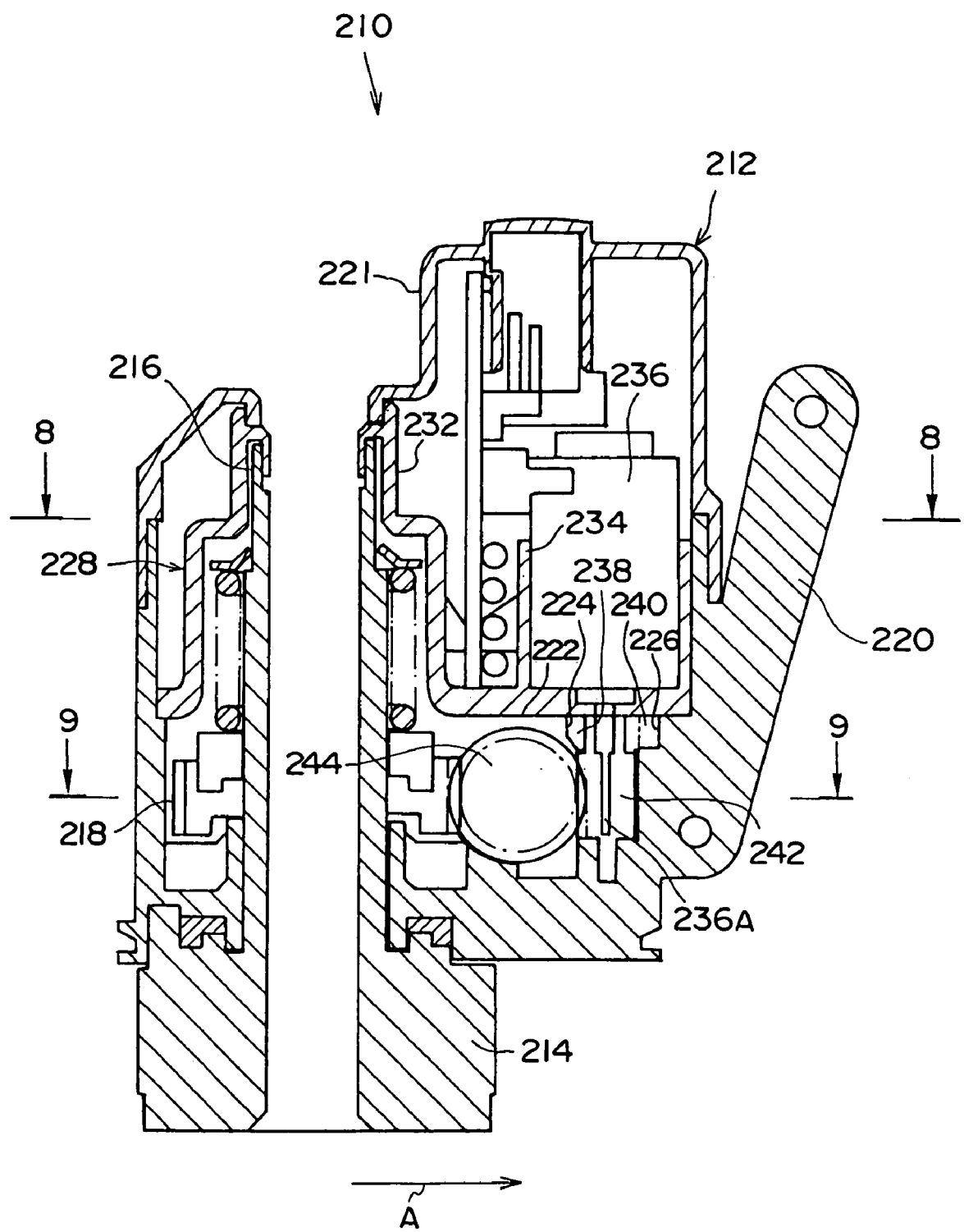
FIG. 6 is a front sectional view of a housing mechanism of a door mirror device according to a second embodiment of the present invention.
Figure 7:
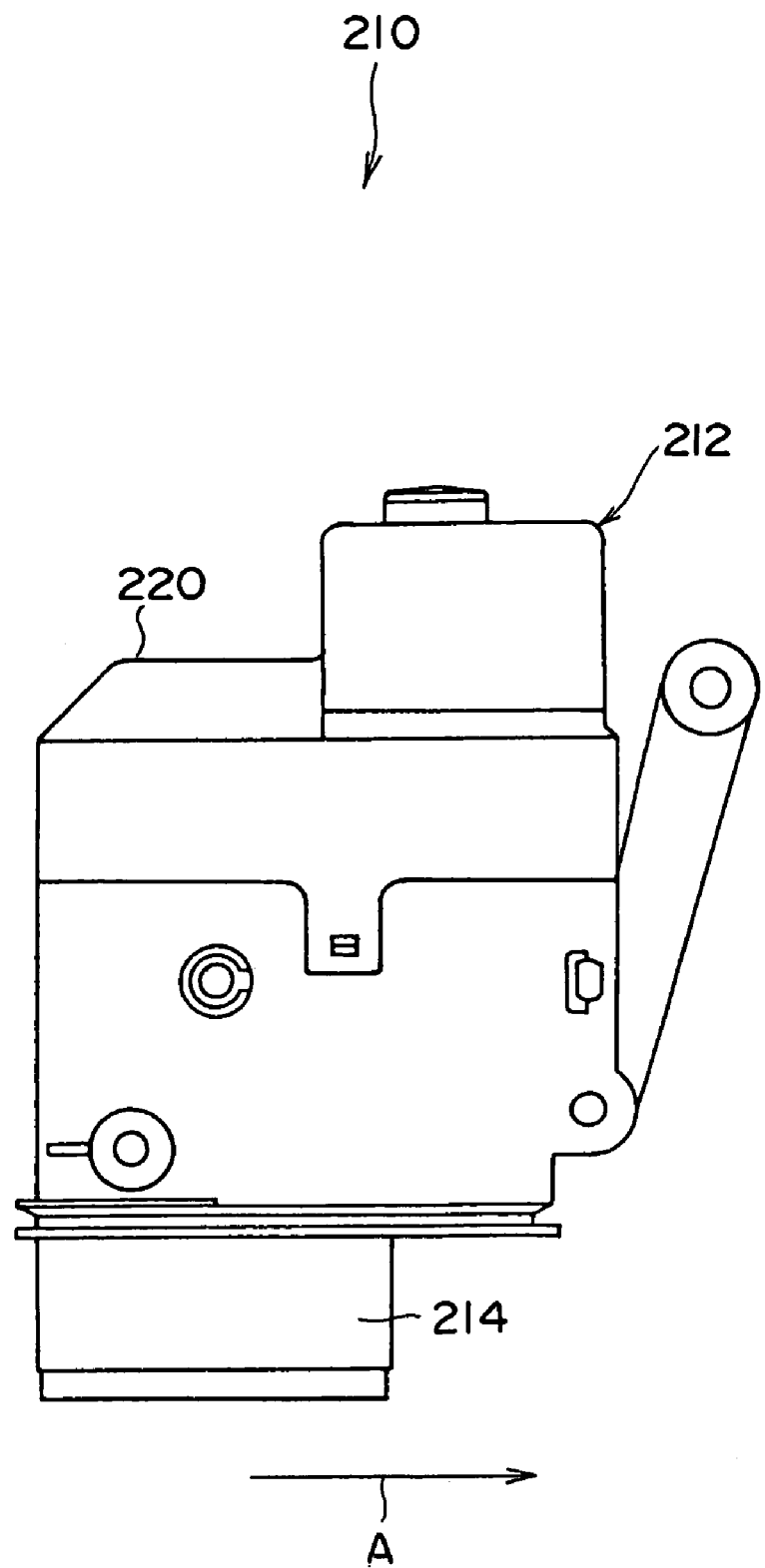
FIG. 7 is a front view of the housing mechanism according to the second embodiment of the present invention.
Figure 8:
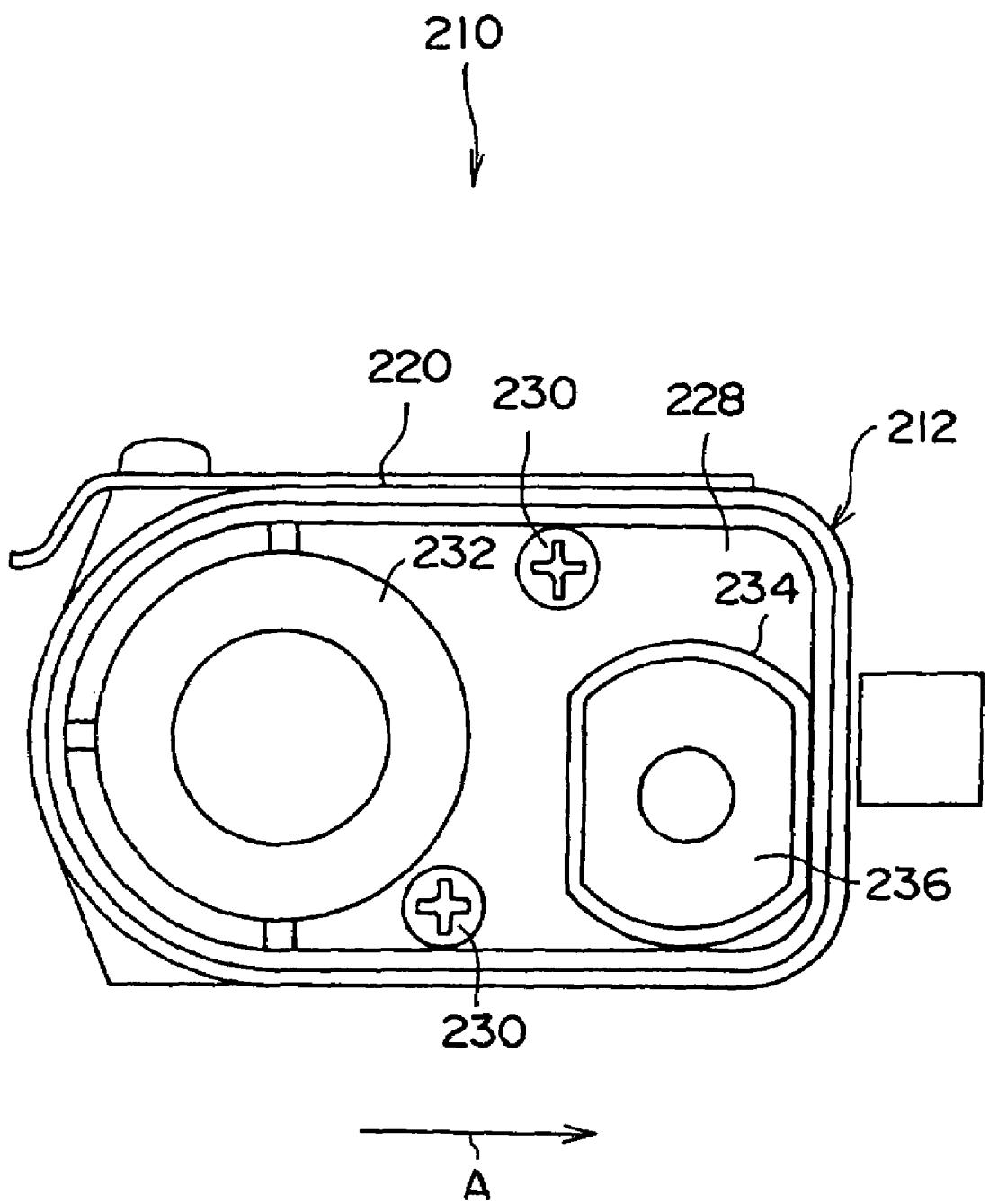
FIG. 8 is a plan view taken along line 8—8 of FIG. 6, of the housing mechanism according to the second embodiment of the present invention.
Figure 9:
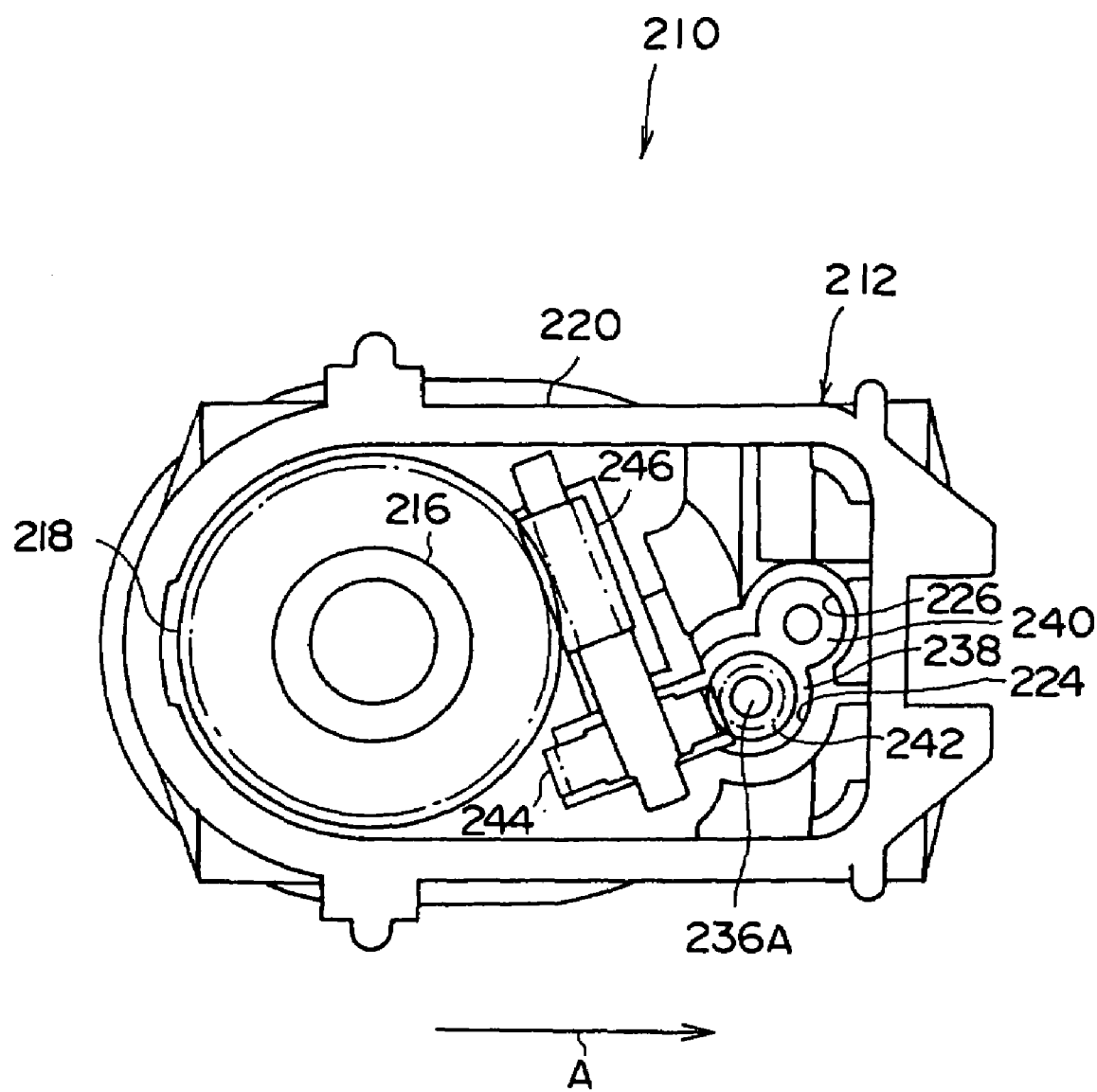
FIG. 9 is a sectional plan view taken along line 9—9 of FIG. 6, of the housing mechanism of the door mirror device according to the second embodiment of the present invention.

FIG. 5 outlines the electrically powered housable-type door mirror device 10 according to this first embodiment in an assembled state. The door mirror device 10 is fixed at a predetermined position to a side of a vehicle body. The door mirror device 10 is comprised of a door stay 12 which is a "door mirror base portion" and extends in a substantially lateral direction of the vehicle, an electrically powered housing unit 14 which swings between a housed position and a position for viewing and is axially supported by a rotation shaft 52B (described hereinafter), which rotation shaft 52B is erected from an extending portion 12A of the stay 12, and a mirror main body portion 16 which swings integrally with the electrically powered housing unit 14.

The mirror main body 16 includes: a frame 18 which has a substantially tabular rectangle shape and is formed of a vertically disposed seat surface for mounting; a visor rim 20 which is disposed at a rear surface side of the frame 18 and is fixed to the frame 18 by screws or the like; a visor cover 22 which is disposed at a front surface side of frame 18 and is fixed to frame 18 covered with the visor rim 20 with engaging claws or the like; and a mirror 24 which is disposed at a rear portion of the visor rim 20 and held to the frame 18 such that the angle of a mirror surface is adjustable.

In addition, the electrically powered housing unit 14 is fixed to the frame 18. This can also be regarded as mirror main body 16 being connected to the electrically powered housing unit 14 via the frame 18, thus forming one unit. Also, by the electrically powered housing unit 14 being axially supported by the rotation shaft 52B of a stand 52 which is described hereinafter, when the electrically powered housing unit 14 swings around the rotation shaft 52B, the mirror main body 16 swings along with the electrically powered housing unit 14.

Reference will be made to FIGS. 1 to 4 in the following description.

The electrically powered housing unit 14 includes: a case 26 which forms the exterior at a lower portion of the unit and whose upper end is open; a gear cover 28 which forms the exterior at an upper portion of the unit, and whose lower end is open; a motor base 30 which is disposed between the case 26 and the gear cover 28 and horizontally divides the space in the unit. Due to strength requirements, the thickness of the members are such that the case 26 is the thickest and the gear cover 28 is the thinnest. In addition, the gear cover 28 covering the case 26 is removable attached by a claw fitting.

The frame 18, which is vertically disposed inside the mirror main body portion 16, is fixed at three points on the case 26. Two (upper and lower) points are on an outer side of the case 26, and one point is at the lower end of an inner side of the case 26. (A first attachment point 32 is set on the outer side of the case 26 so as to be apart from a drive motor 38 (described later), and a second attachment point 34 and third attachment point 36 are set within a transverse direction dimension of the case 26.)

The driving motor 38, which is a drive source, is disposed at a side portion of the outer side of the motor base 30. A worm gear 42 is fixed co-axially to an output shaft 40 of the driving motor 38, and a helical gear 44 meshes with the worm gear 42. The helical gear 44 is fixed to a worm gear shaft 46 and a worm gear 48 is fixed co-axially to the worm gear shaft 46.

A portion towards the inner side of a bottom wall portion 26A of the case 26 is formed integrally with a cylindrical support shaft portion 50. The stand 52 is inserted from the lower side into the support shaft portion 50. The stand 52 is formed of a disc-shaped base portion 52A and the cylindrical rotation shaft 52B, which is erected from an axial center of the base portion 52A. The outer diameter of the base portion 52A is larger than the outer diameter of the support shaft portion 50 of the case 26, and is disposed in a state of projecting from a lower surface side of the bottom wall portion 26A of the case 26. The electrically powered housing unit 14 is assembled by the base portion 52A being fixed to an extending portion 12A of the mirror stay 12. The mirror stay 12 holds the rotation shaft 52B such that the axial direction thereof is substantially in a vertical direction of the vehicle.

An upper end portion of the motor base 30 is anchored to a distal end portion of the rotation shaft 52B of the stand 52, and an upper end portion of the gear cover 28 is anchored to the upper end portion of the motor base 30. Simply stated, the upper end portion of the rotation shaft 52B of the stand 52, the upper end portion of the motor base 30, and the upper end portion of the gear cover 28, form an anchoring structure.

Further, an axial direction middle portion of the rotation shaft 52B of the stand 52 is cut away at two positions opposing each other in the radial direction thereof, and thus the axial direction middle portion of the rotation shaft 52B is formed in a substantially oval shape (athletics track shape) in plan view. Note that this cut-away portion will be referred to as "cutaway portion 54" hereinafter.

A substantially disc-shaped gear plate 56 is disposed, so as to be rotatable, around the rotation shaft 52B of the stand 52. The aforementioned worm gear 48 meshes with an outer peripheral portion of the gear plate 56, and driving force of the driving motor 38 is transmitted thereby. Further, engagement portions whose cross sections have a trapezoid shape or the like, are formed so as to be connected in a peripheral direction on an upper surface of the gear plate 56. A clutch plate 58 formed in a substantial disc shape is disposed on the upper surface of the gear plate 56. Cover engagement portions whose sections have a trapezoid shape or the like and which can engage with the engagement portions of the gear plate 56 are consecutively formed in the peripheral direction on a lower surface of the clutch plate 58, and these cover engagement portions mesh by concave and convex portions fitting together.

In addition, substantially ring-shaped push nuts 60 are fixed at a vicinity of the upper end portion of the rotation shaft 52B of the stand 52, and a compression coil spring 62, which can more broadly be thought of as an urging means, is wound between these push nuts 60 and the upper surface of the clutch plate 58. Thus, the compression coil spring 62 always urges the clutch plate 58 toward the gear plate 56.

Further, a shaft insertion hole 64 which has a substantially oval shape (athletics track shape) and which matches the tabular sectional shape of the rotation shaft 52B is formed at an axial center portion of the clutch plate 58. The cutaway portion 54 of the rotation shaft 52B corresponds to the shaft insertion hole 64, and as a result, the clutch plate 58 cannot rotate with respect to the rotation shaft 52B.

Slip washers 66 are disposed between a lower surface of the gear plate 56 and an upper end portion of the support shaft portion 50 of the case 26, and also between the lower end portion of the support shaft portion 50 and the upper surface of the base portion 52A of the stand 52. These slip washers 66 reduce frictional resistance when the electrically powered housing unit swings.

Figure 1:
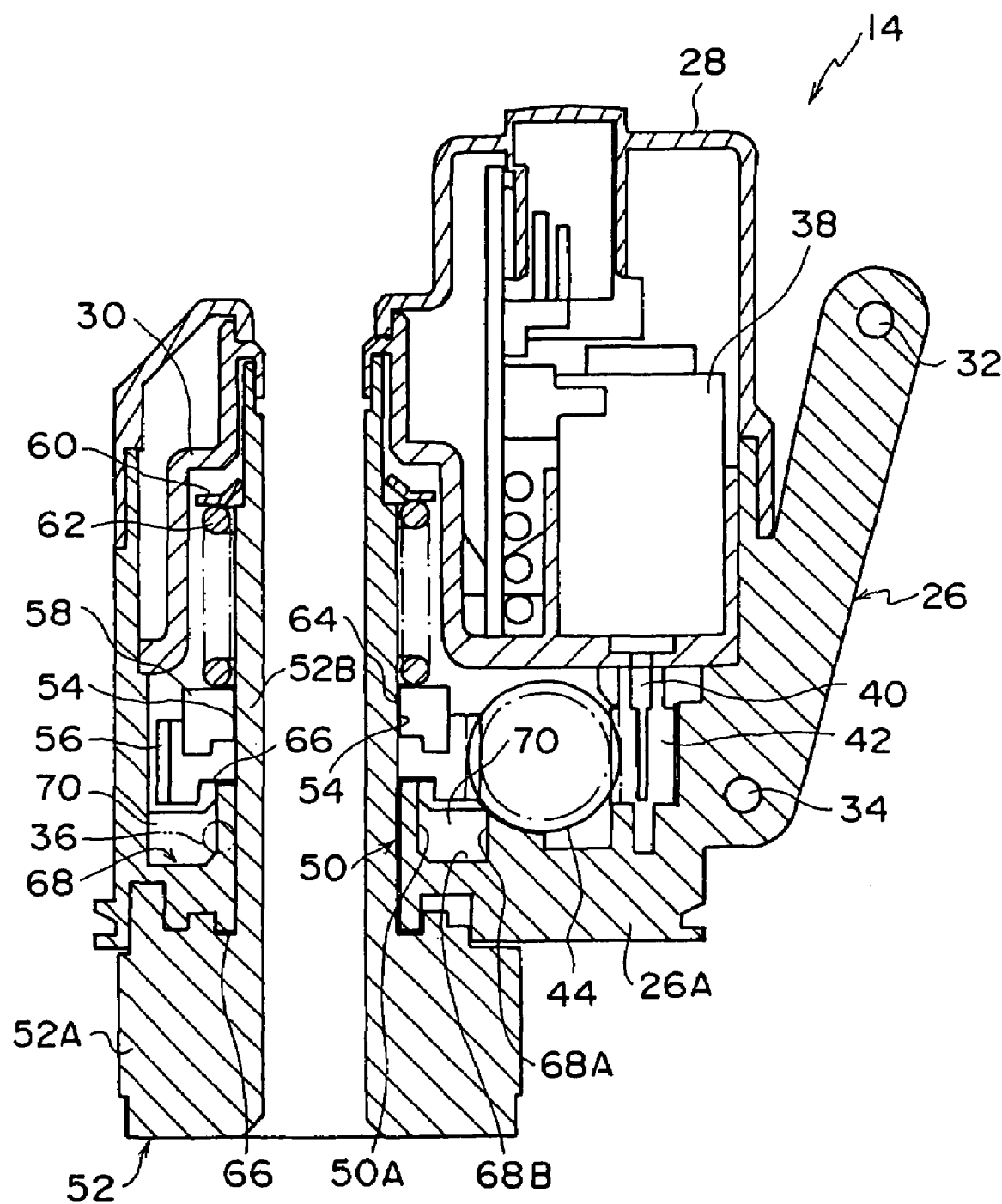
FIG. 1 is a longitudinal sectional view taken along line 1—1 of FIG. 4, of an electrically powered housing unit of an electrically powered housing-type door mirror device according to a first embodiment of the present invention.
Figure 2:
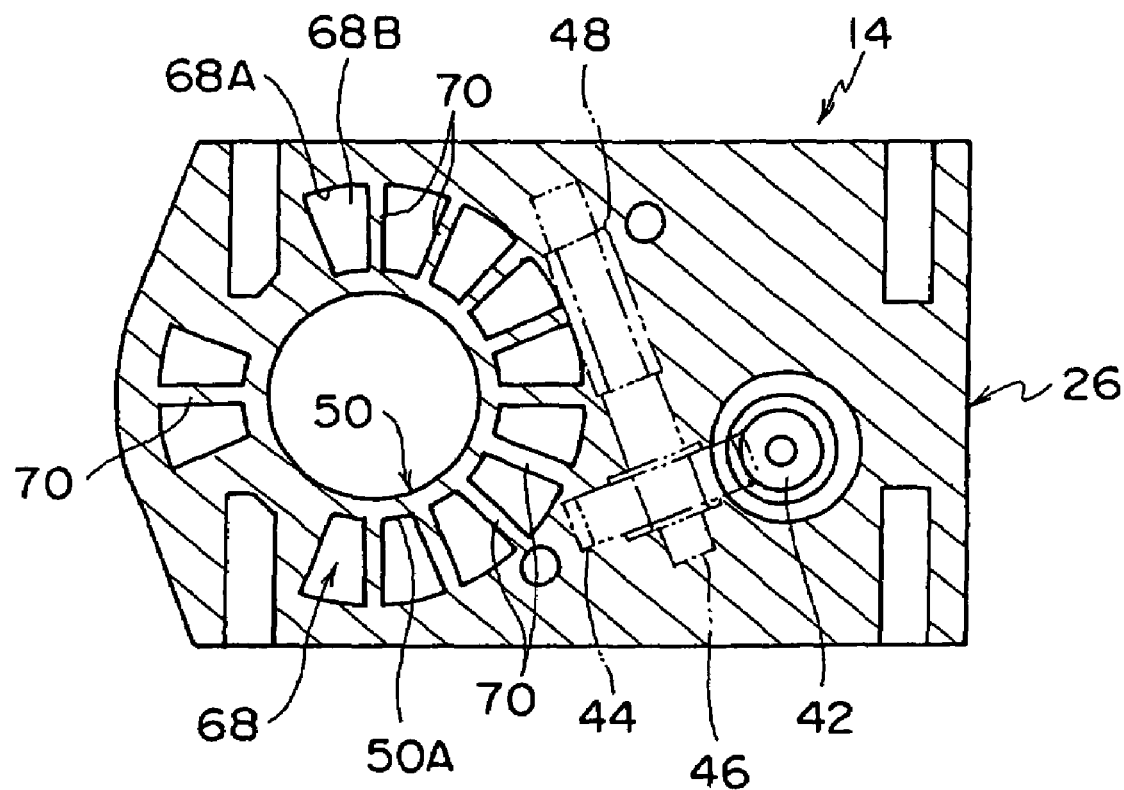
FIG. 2 is a cross sectional view taken along line 2—2 of FIG. 3, of the electrically powered housing unit according to the first embodiment of the present invention.
Figure 3:
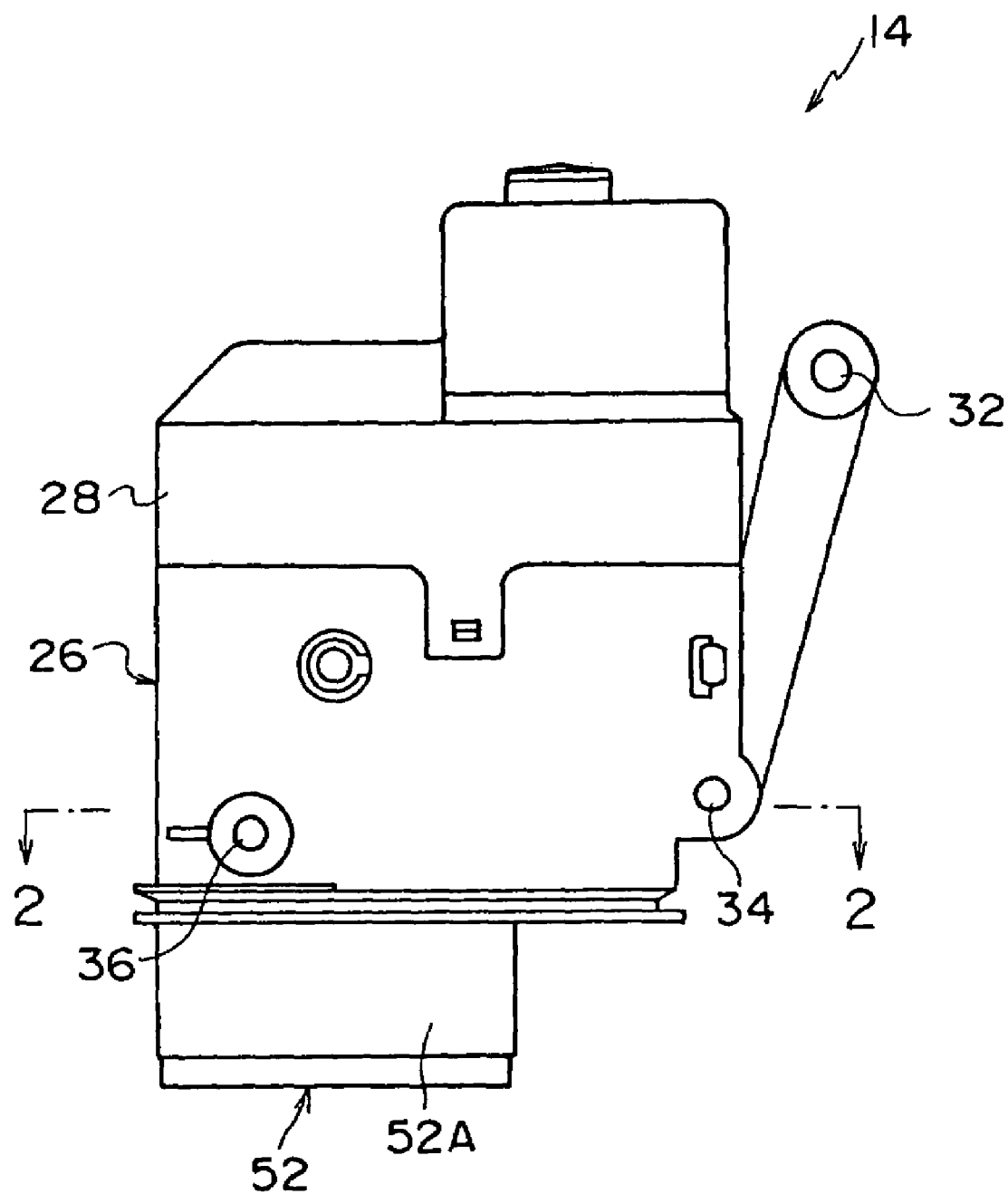
FIG. 3 is a front view of the electrically powered housing unit according to the first embodiment of the present invention.
Figure 4:
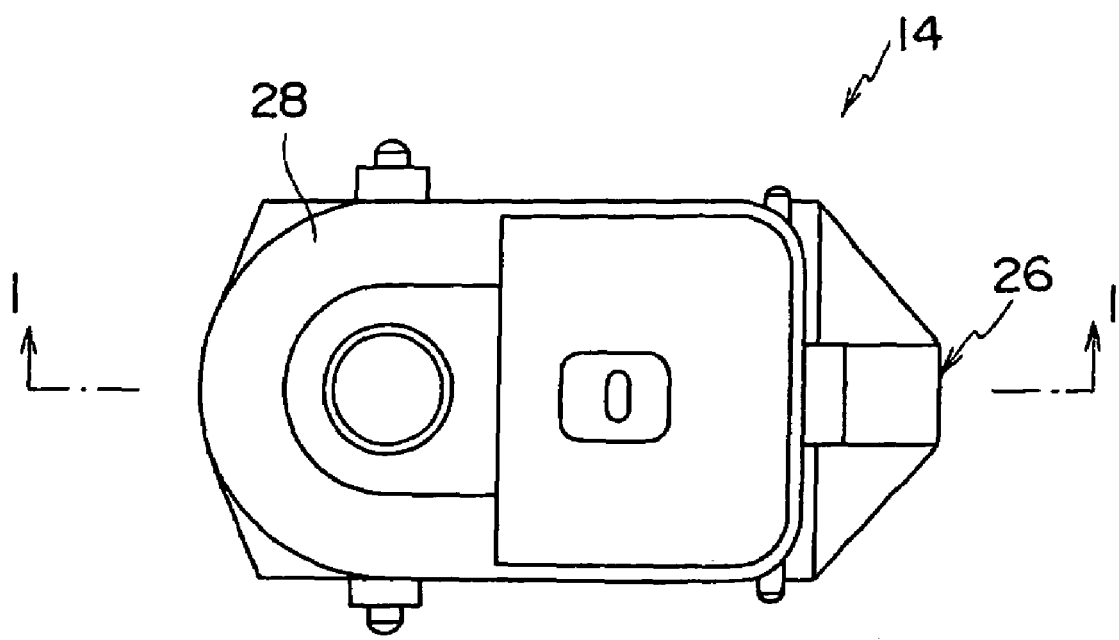
FIG. 4 is a plan view of the electrically powered housing unit according to the first embodiment of the present invention.

As illustrated in FIGS. 1 and 2, ring-form concave portions 68, which are "wall portions" are formed at the outer periphery side of the cylindrical support shaft portion 50 which is formed in the case 26. An outer peripheral surface 50A of the support shaft portion 50 and an inner peripheral surface 68A of the concave portions 68 are disposed so as to face each other. A plurality of ribs 70 are formed radially from the outer peripheral surface 50A of the support shaft portion 50. Inner ends of these ribs 70 are connected with the outer peripheral surface 50A of the support shaft portion 50, outer ends are connected to the inner peripheral surface 68A of the concave portions 68, and lower ends are connected to a bottom surface 68B of the concave portions 68.

Next, the operation and effects of the first embodiment will be described.

First, movement of the door mirror device 10 at a time of housing will be outlined.

When the driving motor 38 drives, the output shaft 40 rotates about its axis. As a result, the worm gear 42 which is fixed to the output shaft 40 rotates at the same rate, and causes the helical gear 44 to rotate a lower rate. When the helical gear 44 rotates, the worm gear shaft 46 to which the helical gear 44 is fixed rotates about the axis of the helical gear 44. As a result, the worm gear 48 which is fixed to the worm gear shaft 46 rotates at the same speed. In this manner, the driving force of the driving motor 38 is transmitted to the gear plate 56 which meshes with the worm gear 48. However, the clutch plate 58 is frictionally engaged with the gear plate 56 by the urging force of the compression coil spring 62. As a result, the clutch plate 58 blocks the rotation of the gear plate 56, and thus an anti-drive force which acts on the gear plate 56 acts on the electrically powered housing unit 14. The entire electrically powered housing unit 14 swings via the case 26 about the rotational axis 52B of the stand 52 causing the mirror main body portion 16 to be housed.

If the mirror main portion 16 receives an external force such that an external force exceeding a predetermined value acts on the case 26, the gear plate 56 and the clutch plate 58 which were frictionally engaged become disengaged, and rotation of the gear plate 56 with respect to the clutch plate 58 is allowed. Thus, the gear plate 56 rotates along with the case 26, which prevents the gear plate 56 from being damaged.

The cylindrical support shaft portion 50 which is supported with the rotation shaft 52B of the stand 52 is formed in the case 26 which forms the exterior of the electrically powered housing unit 14. The load of the electrically powered housing unit 14 and the mirror main body 16 is exerted on the support shaft portion 50. However, in the present embodiment of the present invention, since the reinforcement ribs 70 are provided radially on the outer periphery of the support shaft portion 50, the rigidity of the support shaft portion 50 can be sufficiently enhanced without increasing the plate thickness of the support shaft portion 50 or the like. Correspondingly, according to the present embodiment, vibration of the mirror main body 16 in a substantially longitudinal direction of the vehicle, around a center at the vicinity of the support shaft portion 50 is efficiently restrained and further, can be prevented. Also, according to the present embodiment, since it is not necessary to increase the thickness of the support shaft portion 50 and the bottom portions of the concave portions 68 of the case 26 and the like, problems such as shrinkage and warping on the surface of the case 26 and the necessity of increasing the number of steps in the production of case 26 are not caused.

In addition, according to the present embodiment, since the ribs 70 are formed radially from the cylindrical support shaft portion 50, the ribs 70 can be uniformly, or substantially uniformly, reinforced. As a result, a merit of the present embodiment is that stress concentration caused by unevenness in the reinforcement is unlikely.

In the present embodiment, the ribs 70 extend from the outer peripheral surface 50A of the support shaft portion 50 outward in the radial direction and are connected to the bottom surface 68B of the concave portions 68. Since the outer peripheral surface 50A of the support shaft portion 50 and the inner peripheral surface 68A of the concave portions 68 are provided so as to be connected, the rigidity of the support shaft portion 50 is effectively enhanced. As a result, the load which acts on the support shaft portion 50 is smoothly transmitted to the bottom wall portion 26A of the case 26, via the ribs 70. In other words, the load is supported by the entire case 26.

Figure 18:
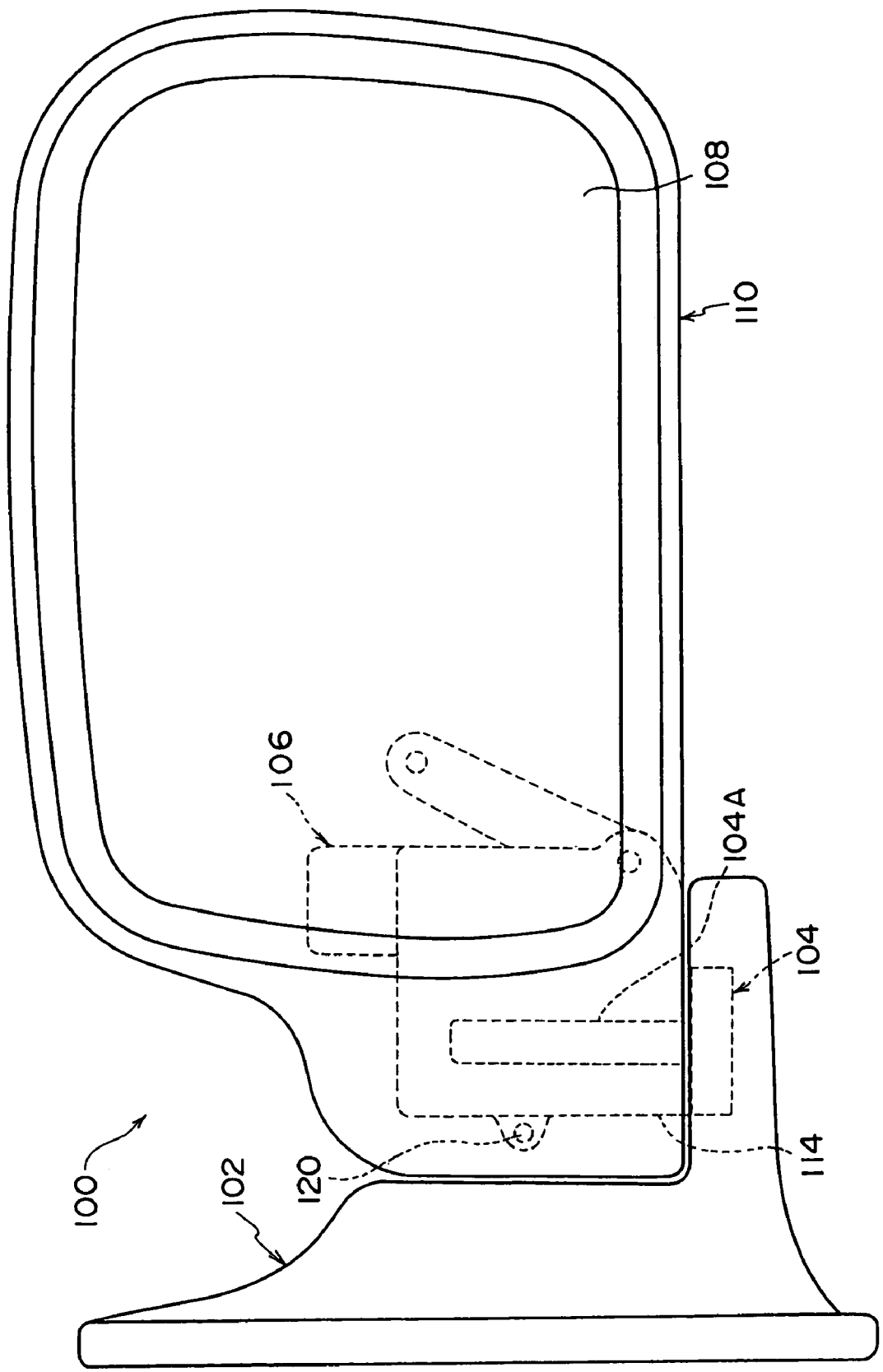
FIG. 18 is a front view outlining overall structure of an electrically powered housable-type door mirror of the prior art.
Figure 19:
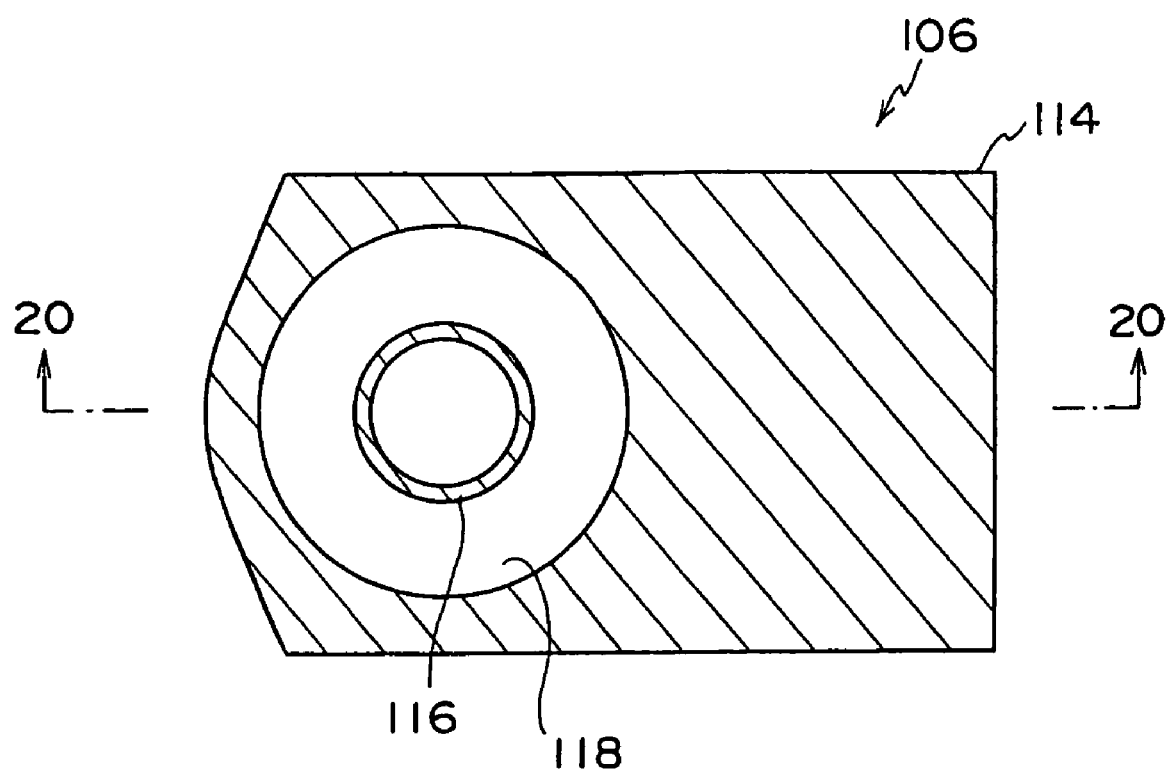
FIG. 19 is a cross sectional view corresponding to FIG. 2, of a case to be assembled to an electrically powered housing unit of the prior art.
Figure 20:
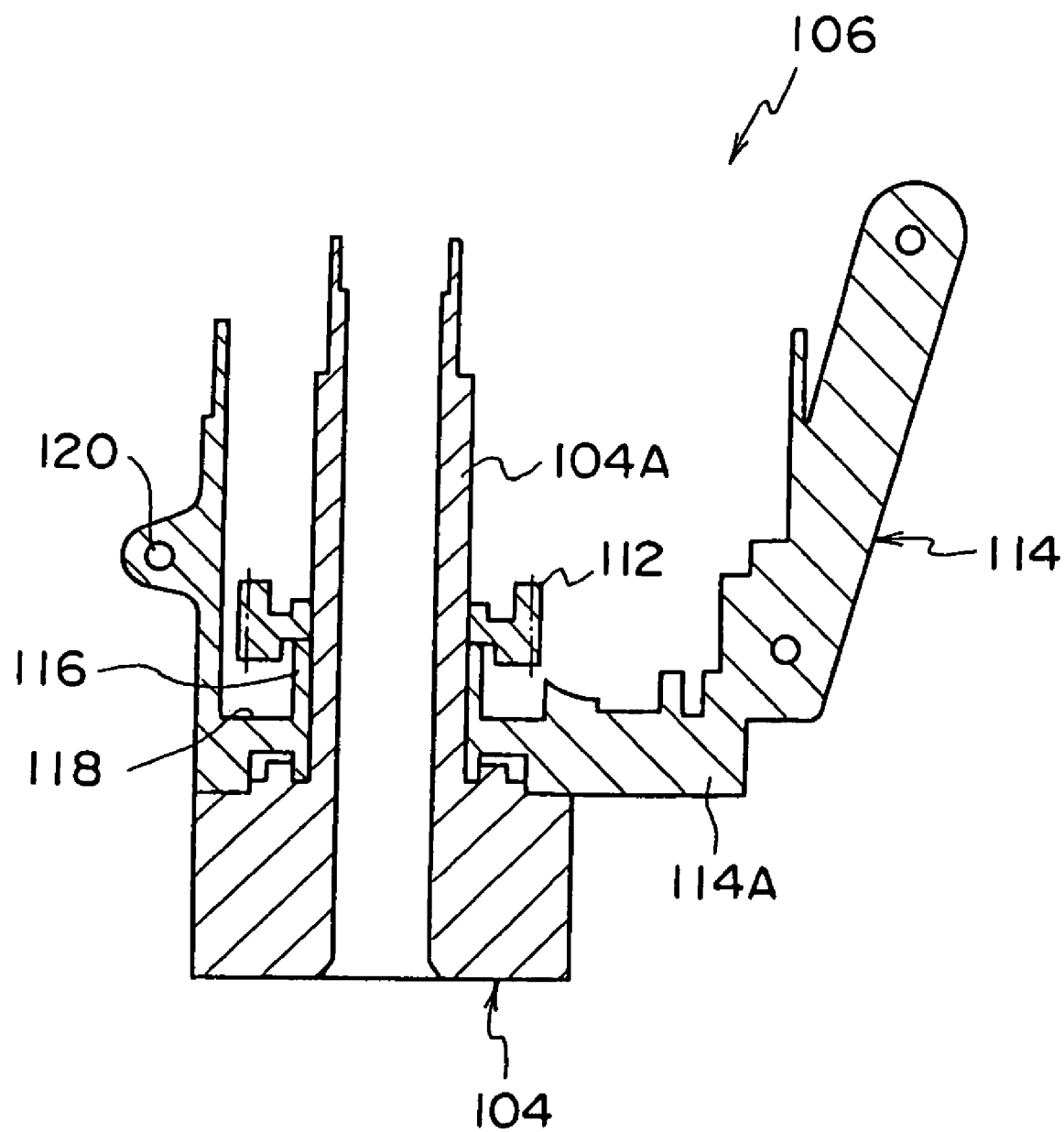
FIG. 20 is a cross sectional view taken along line 20—20 of the case and the like of FIG. 19.
Figure 21:
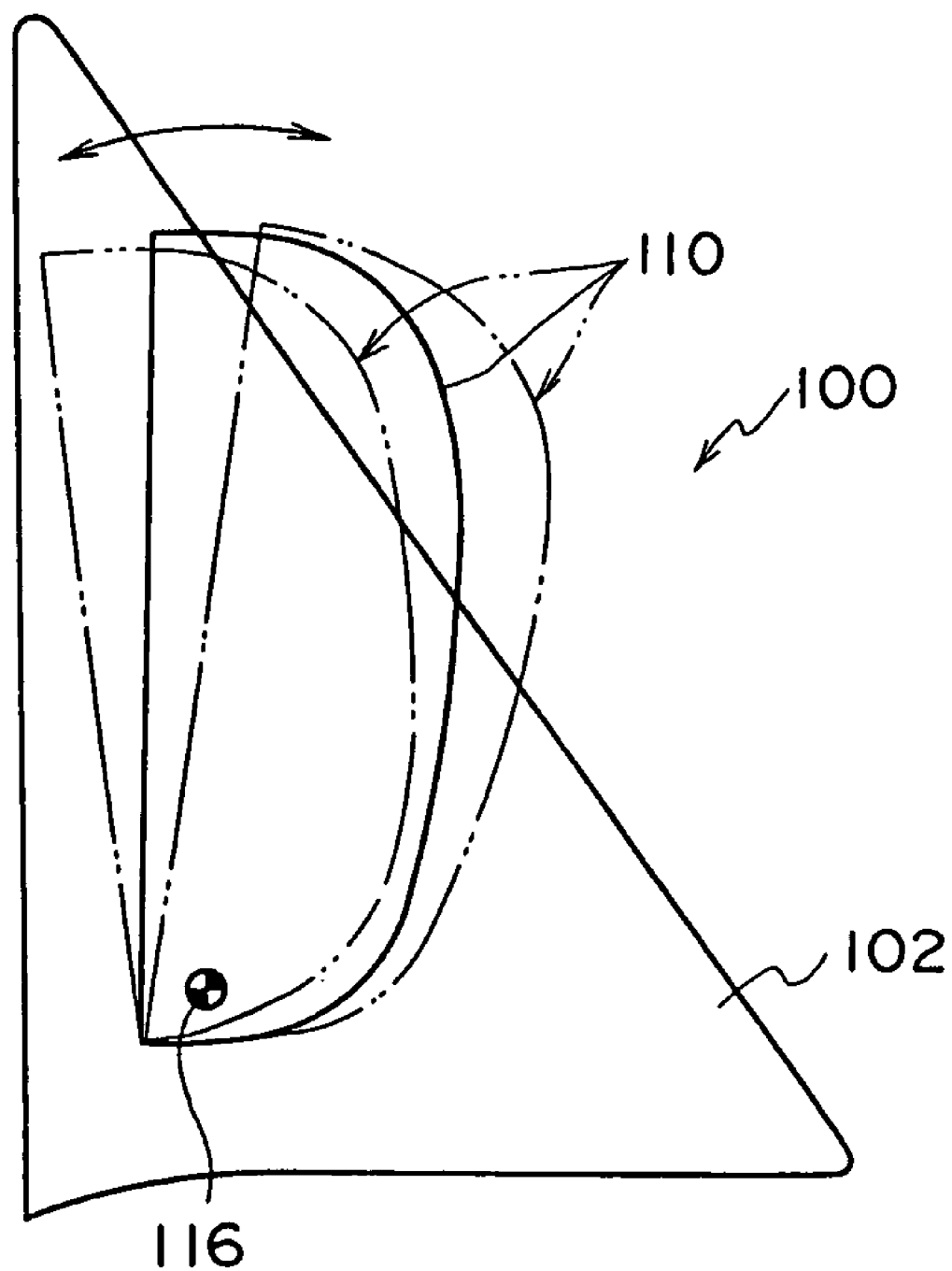
FIG. 21 is a schematic side view for describing problems of a door mirror device of the prior art.

In addition, according to the present embodiment, since the ribs 70 are plurally provided on the periphery of the support shaft portion 50 of the case 26 and the rigidity of the periphery of the support shaft portion 50 is enhanced, it is possible for the third attachment point 36 for fixing the case 26 to the frame 18 to be set within the width direction dimension of the case 26. In other words, in the present embodiment, the third attachment point 36 is set in the vicinity of the support shaft portion 50, and within a range that has been reinforced by the ribs 70. Incidentally, in the case of the structure of the prior art, as shown in FIGS. 18 and 20, a third attachment point 120 is set at a position which extends in a radial direction beyond the inner side of the case 114. Consequently, the width direction dimension of the case 26 in the present embodiment may be made shorter than in the prior art. Therefore, the electrically powered housing unit 14 can be made more compact in the width direction. Consequently, the electrically powered housing unit 14 can be used with a smaller mirror.

Although the ribs 70 for reinforcement are formed radially on the periphery of the support shaft portion 50 in the present embodiment, the ribs are not necessarily provided radially. For example, the ribs may be provided in cross shapes around the support shaft portion, or just one pair of ribs may be provided.

Also, in the present embodiment, the outer end portions of the reinforcing ribs 70 are connected to the inner peripheral surface 68A of the concave portions 68, but the outer end portions of the ribs do not necessarily have to be connected to the inner peripheral surface of the concave portions. Even in a case without such connection, a reinforcing effect can be expected to some extent.

Further, the present invention may be applied to a manual housing-type door mirror (besides the electrically powered housable-type).

Second Embodiment

A door mirror device 210 according to a second embodiment of the present invention will be described with reference to FIGS. 6 to 9.

The mirror device 210 includes a housing mechanism 212 and the housing mechanism 212 is provided with a stand 214. The stand 214 is fixed to a stay (not shown), which is fixed to a vehicle door or the like. A cylindrical support shaft 216 is provided integrally with the stand 214 so as to be erect, and the support shaft 216 is fixed via the stand 214 to a side of the vehicle body. A gear plate 218 is disposed around the support shaft 216, and rotation of the gear plate 218 with respect to the support shaft 216 is blocked.

The housing mechanism 212 includes a case 220 and a cover 221 which covers and upper opening portion of the case 220. The support shaft 216 is inserted through the case 220 and thus the case 220 is rotatably supported by the support shaft 216. The case 220 is connected to a mirror (not shown) for viewing the rear direction of the vehicle via a frame and a mirror surface-adjusting mechanism, and the case 220 (and the cover 221) rotates integrally with the mirror.

The case 220 is provided with a horizontal surface portion 222 at a side opposite to a vehicle side (at the side indicated by arrow A in FIG. 6), at a substantially central portion in a vertical direction. A substantially cylinder-shaped fitting hole (fitting portion) 224 and a substantially cylinder-shaped blocking hole (blocking means) 226 are formed at the horizontal surface 222, and the fitting hole 224 and the blocking hole 226 are in communication.

A substantially plate-shaped motor base 228 is mounted so as to be fixed inside the case 220. The motor base 228 is fixed at both end portions thereof in a longitudinal direction of the vehicle, with a predetermined number of screws 230 (2 in the present embodiment) to the horizontal surface portion 222 within the case 220. A substantially cylindrical-shaped standing cylinder 232 is erected at a vehicle inner side upper surface of the motor base 228, and the support shaft 216 is disposed inside the standing cylinder 232.

An elliptical cylinder-shaped fitting cylinder 234 is provided so as to be erect on a vehicle outer side upper surface of the motor base 228, and a motor 236 is mounted onto the motor base 228 by the motor 236 being fitted into the fitting cylinder 234. In addition, an output shaft 236A of the motor 236 is inserted through the motor base 228 and disposed at a lower side of the motor base 228.

A substantially cylindrical, hollow control portion 238 is provided on the vehicle outer side lower surface of the motor base 228. The output shaft 236A of the motor 236 is inserted through the center of the inner portion of the control portion 238. The outer periphery of the control portion 238 fits into the fitting hole 224. A substantially cylindrical-shaped blocking projection (blocking means) 240 is also provided at the vehicle outer side lower surface of the motor base 228. The blocking projection 240 is formed integrally with the control portion 238. The blocking projection 240 fits into the blocking hole 226, to block rotation of the motor base 228 with respect to the case 220.

A worm gear 242 is mounted to the output shaft 236A of the motor 236. A lower portion of the worm gear 242 is rotatably supported by a lower wall of the case 220. By the worm gear 242 being simply inserted onto the output shaft 236A of the motor 236, the worm gear 42 is rendered unable to rotate relative to the output shaft 236A of the motor 236, but movable in an axial direction relative to output shaft 236A of the motor 236. In addition, the worm gear 242 substantially fits into the control portion 238 of the motor base 228 and can abut therein. Perpendicular direction movement of the worm gear 242 with respect to the output shaft 236A of the motor 236 is thereby restrained.

Similarly to the worm gear 242, a helical gear 244 is supported by the inner portion of the case 220, and the helical gear 244 meshes with the worm gear 242. The helical gear 244 is integrally provided with a shaft worm gear 246, and the shaft worm gear 246 meshes with the gear plate 218.

Thus, when the motor 236 is driven, rotational force is transmitted to the worm gear 242, the helical gear 244 and the shaft worm gear 246, and this rotational force is exerted on the gear plate 218 of the support shaft 216. As a result, due to anti-rotational force, the shaft worm gear 24 swings around the gear plate 218 and causes 220 to swing, and the mirror thereby swings, to be housed or brought to a position for viewing.

The following is a description of the effects of the second embodiment.

When the motor 236 is driven, the worm gear 242, the helical gear 244 and the shaft worm gear 246 are rotated, and thus the case 220 swings due to anti-rotational force which is exerted on the gear plate 218 of the support shaft 216. As a result, the mirror swings together with the case 220 and is housed or swung to a position for viewing.

Since the worm gear 242 is mounted such that it cannot rotate relative to the output shaft 236A of the motor 236, but can move in an axial direction relative to the output shaft 236A of the motor 236, the output shaft 236A of the motor 236 does not experience translational force from the worm gear 242. Thus, the life span of the motor 236 can be lengthened.

Further, since the output shaft 236A of the motor 236 does not receive sliding force from the worm gear 242, the motor 236 can be mounted to the motor base 228 simply by fitting the motor 236 into the fitting cylinder 234 of the motor base 228. Thus, screws for fixing the motor to the motor base as in the prior art are unnecessary, and, since the number of parts is decreased, ease of assembly is improved.

Further, the control portion 238 which is integrally provided with the motor base 228 can abut the worm gear 242, and thus movement of the worm gear 242 in a perpendicular direction with respect to the output shaft 236A of the motor 236 is limited. As a result, slipping of the worm gear 242 in a direction perpendicular to the shaft is prevented. Also, operational noise of the worm gear 242 and the helical gear 244 can be reduced, and skidding of the worm gear 242 can be reduced.

In addition, since the control portion 238 of the motor base 228 is fitted into the fitting hole 224 of the case 220, the control portion 238 can be favorably positioned relative to the case 220. As a result, positioning of the worm gear 242 in the control portion 238 is also favorable and control of slipping of the worm gear 242 in a perpendicular direction with respect to the shaft is ensured.

Further, since the blocking projection 240 of the motor base 228 is fitted into the blocking hole 226 of the case 220, rotation of the motor base 228 with respect to the case 220 is blocked. As a result, the control portion 238 is always favorably positioned in the case 220, and thus the worm gear 242 and the control portion 238 are always favorably positioned so that control of slipping of the worm gear 242 in the direction perpendicular to the shaft is further ensured.

In the second embodiment, the blocking projection 240 of the motor base 228 is fitted into the blocking hole 226 of the case 220 as a blocking means. However, in place of this, the blocking means may be formed such that the outer periphery of the fitting hole of the case member and the outer periphery of the control portion of the motor base have shapes other than a round shape, and rotation of the motor base with respect to the case member is thus blocked by the periphery of the fitting hole of the case member and the outer periphery of the control portion of the motor base fitting together.

Also, the present invention may be applied to a fender mirror device for a vehicle.

Third Embodiment

Lastly, a door mirror device for a vehicle according to a third embodiment of the present invention will be described with reference to FIGS. 10 to 17.

A door mirror device 310 includes a housing mechanism 312. A stand 314 is provided to the housing mechanism 312. The stand 314 is fixed to a mirror stay (not shown) which is fixed to a vehicle door. The stand 314 is provided integrally with a cylindrical support shaft 316 so as to be erect. The support shaft 316 is fixed by the stand 314 to a side of the vehicle body.

Figure 10:
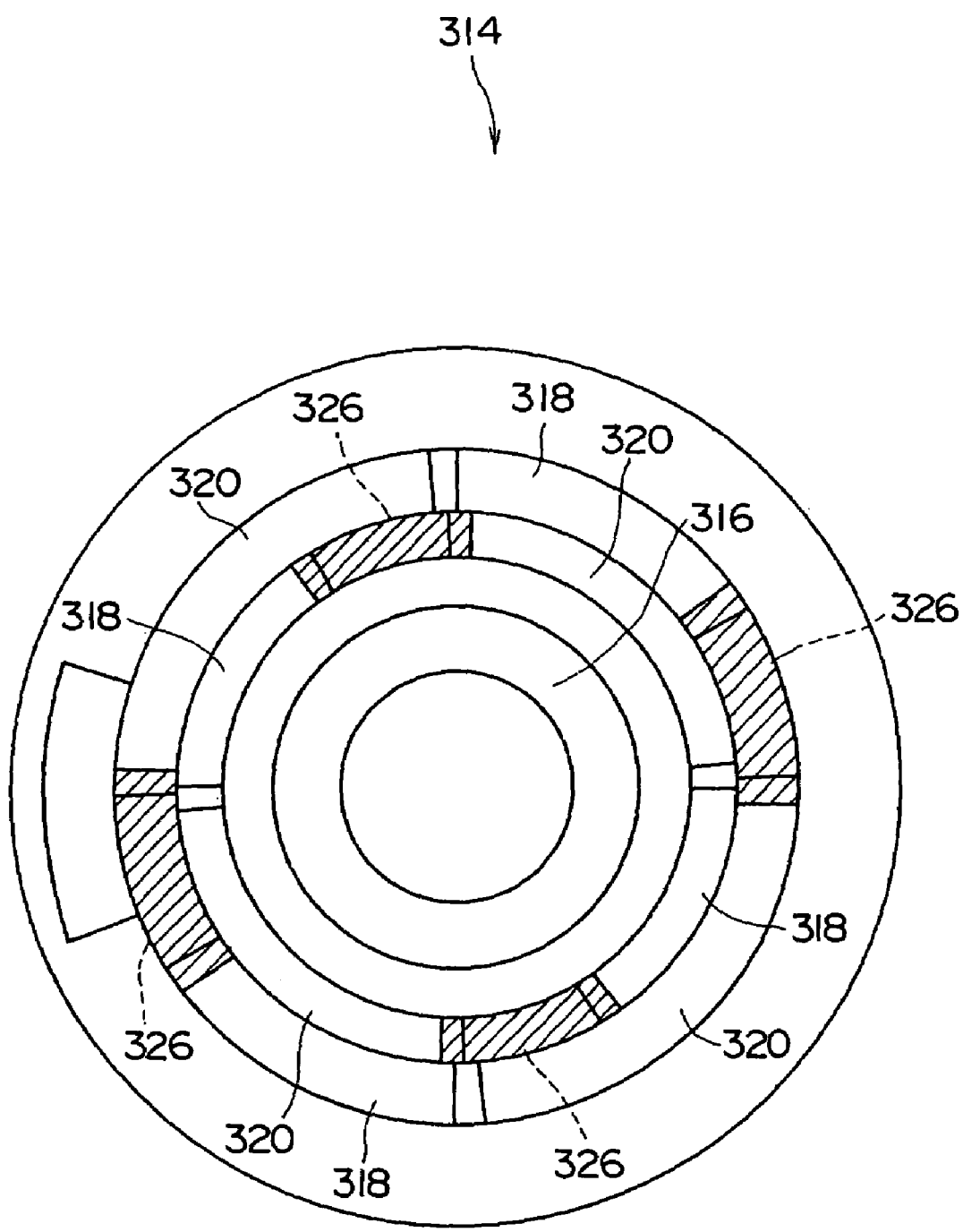
FIG. 10 is a plan view of a stand of a door mirror device according to a third embodiment of the present invention.
Figure 11:
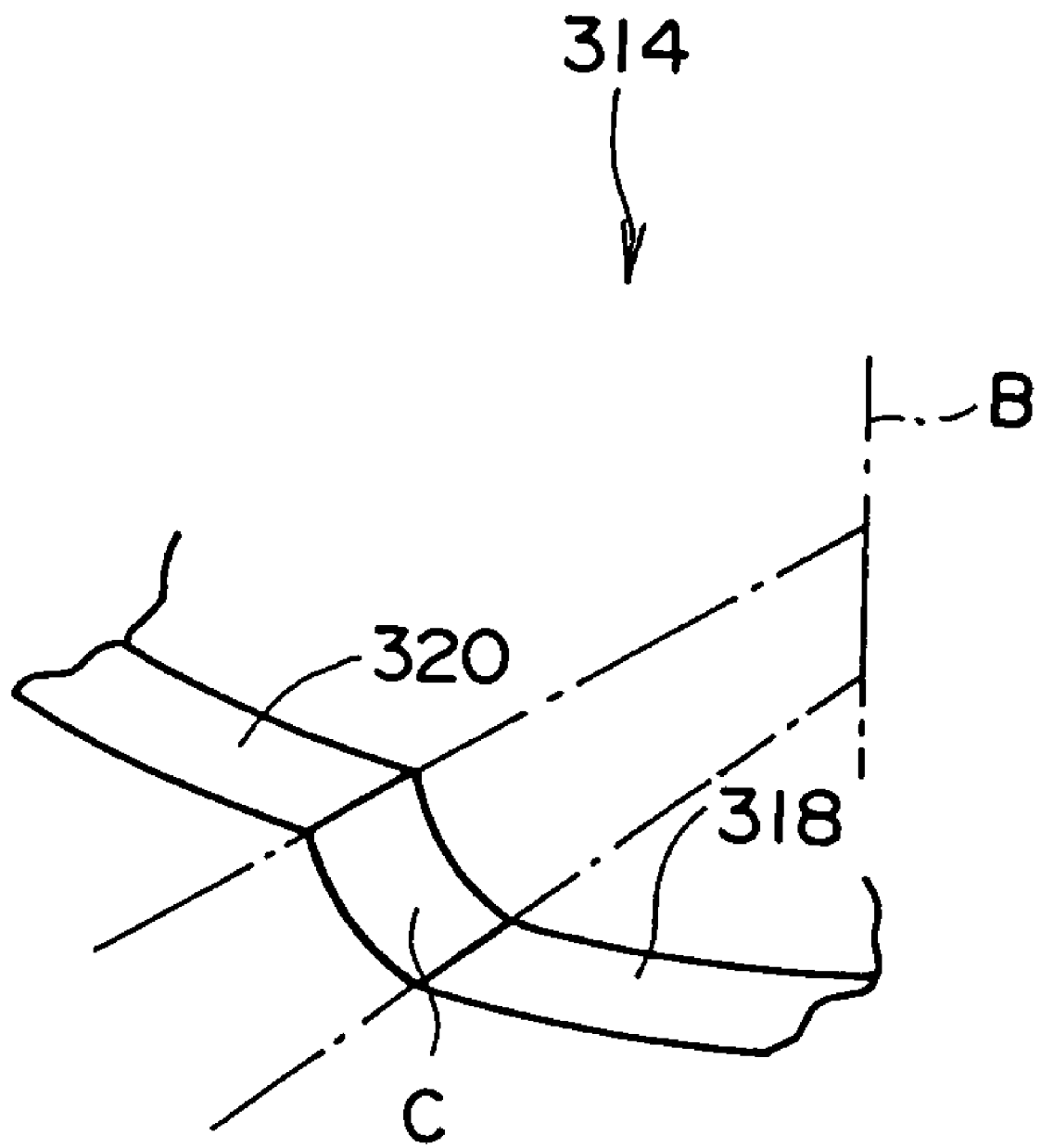
FIG. 11 is a perspective view of an end portion of a stand concavity of the door mirror device according to the third embodiment of the present invention.
Figure 12:
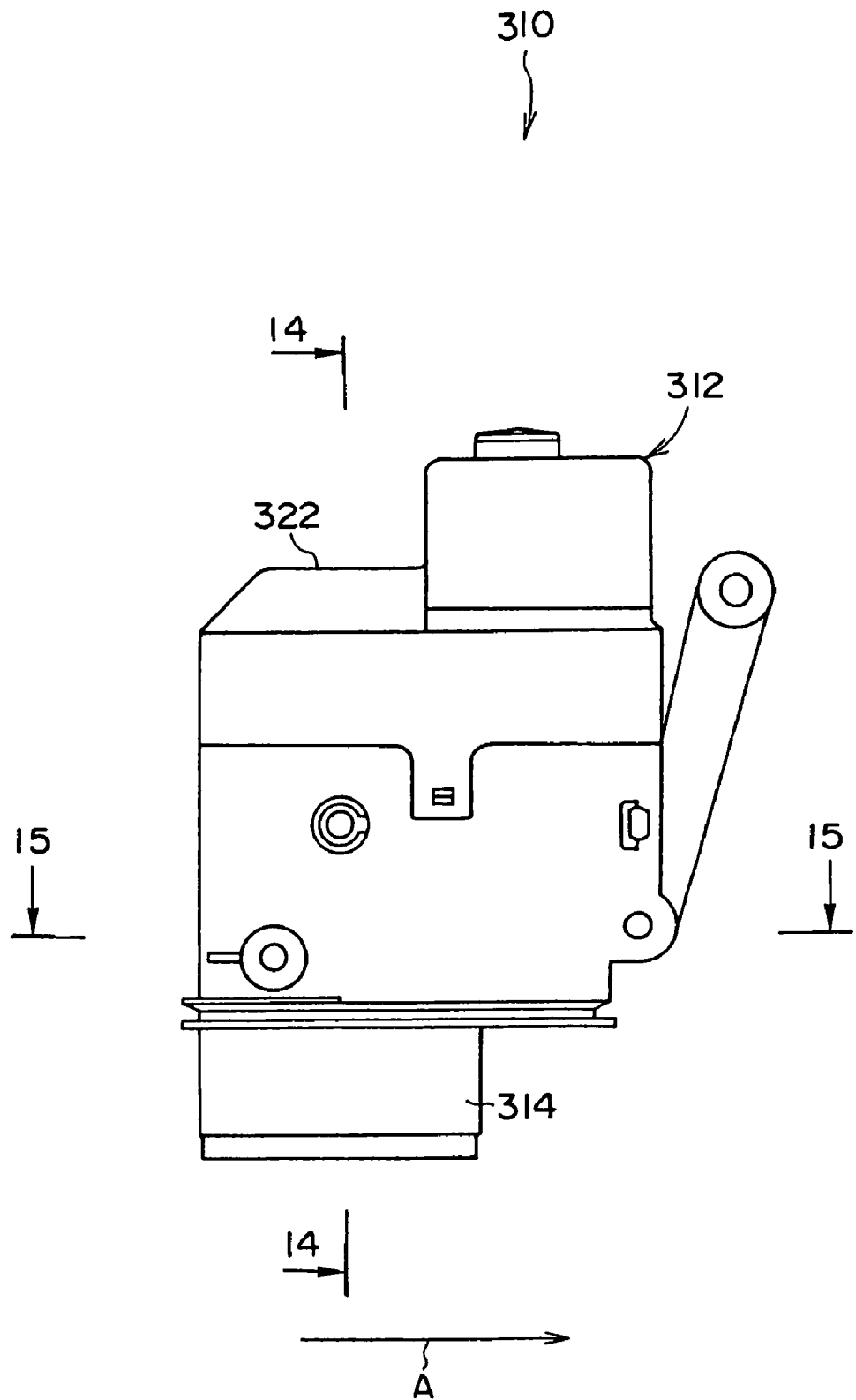
FIG. 12 is a front view of the housing mechanism according to the third embodiment of the present invention.
Figure 13:
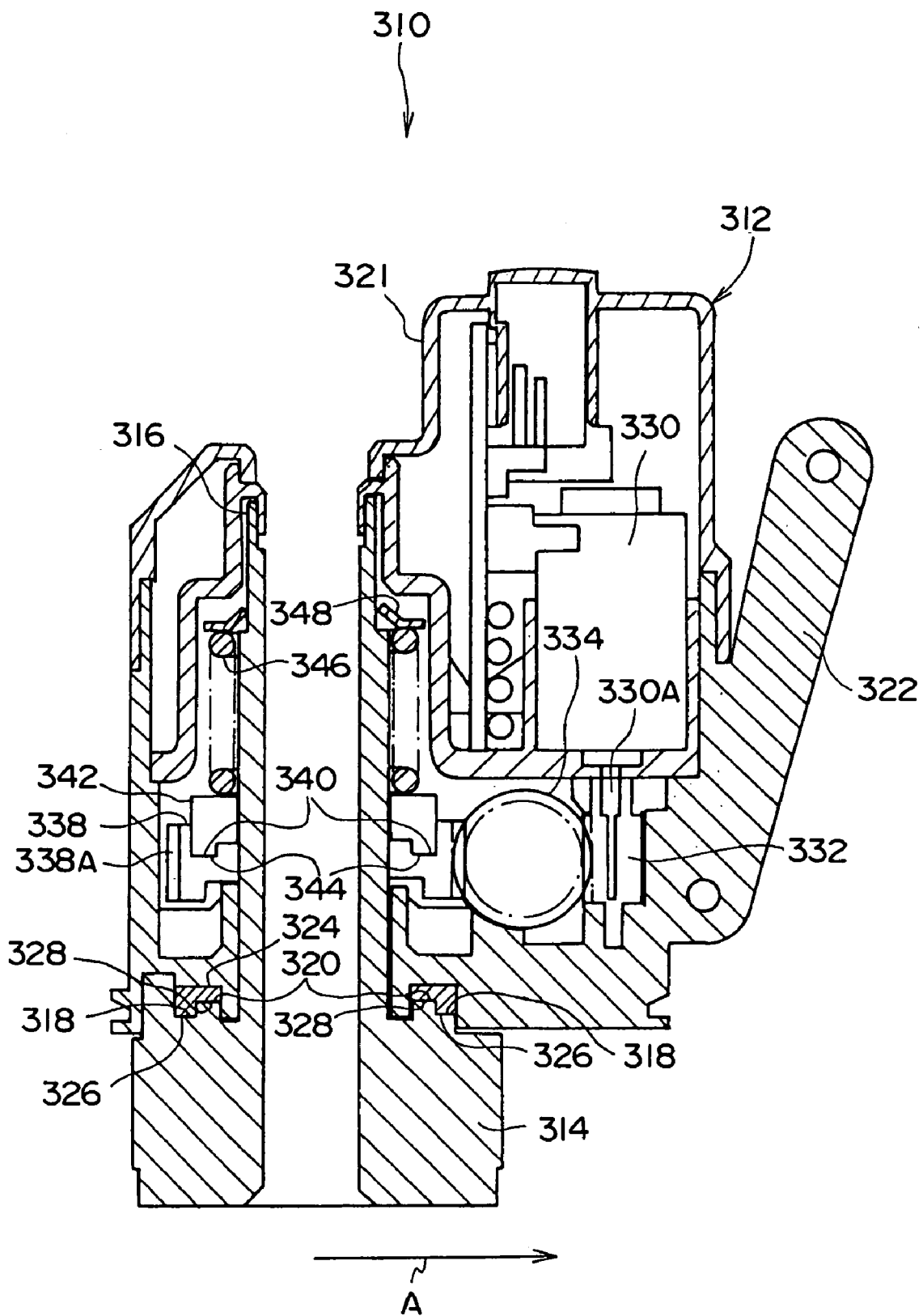
FIG. 13 is a front sectional view of the housing mechanism according to the third embodiment of the present invention.
Figure 14:
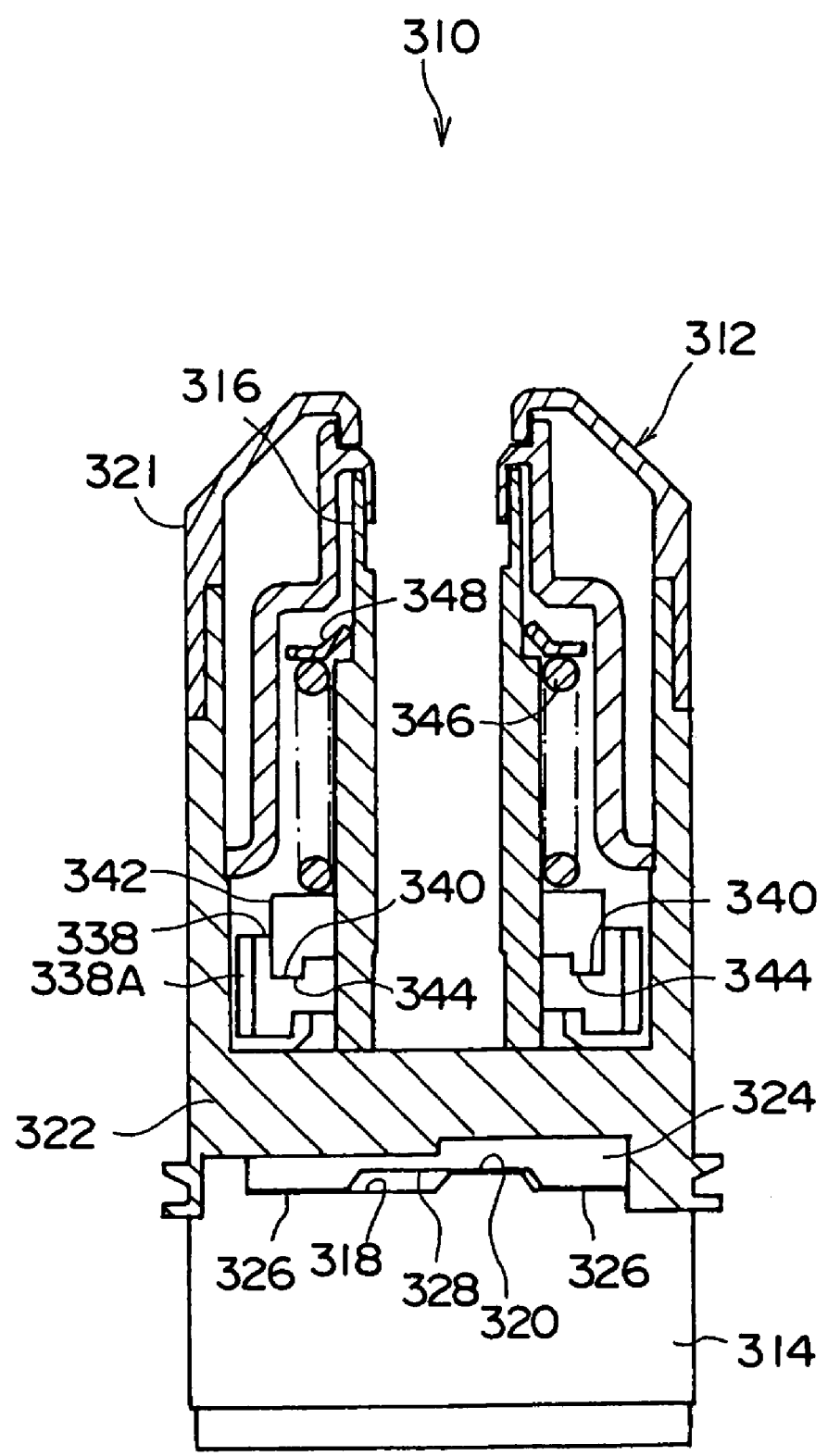
FIG. 14 is a side sectional view taken along line 14—14 of FIG. 12, of the housing mechanism according to the third embodiment of the present invention.
Figure 15:
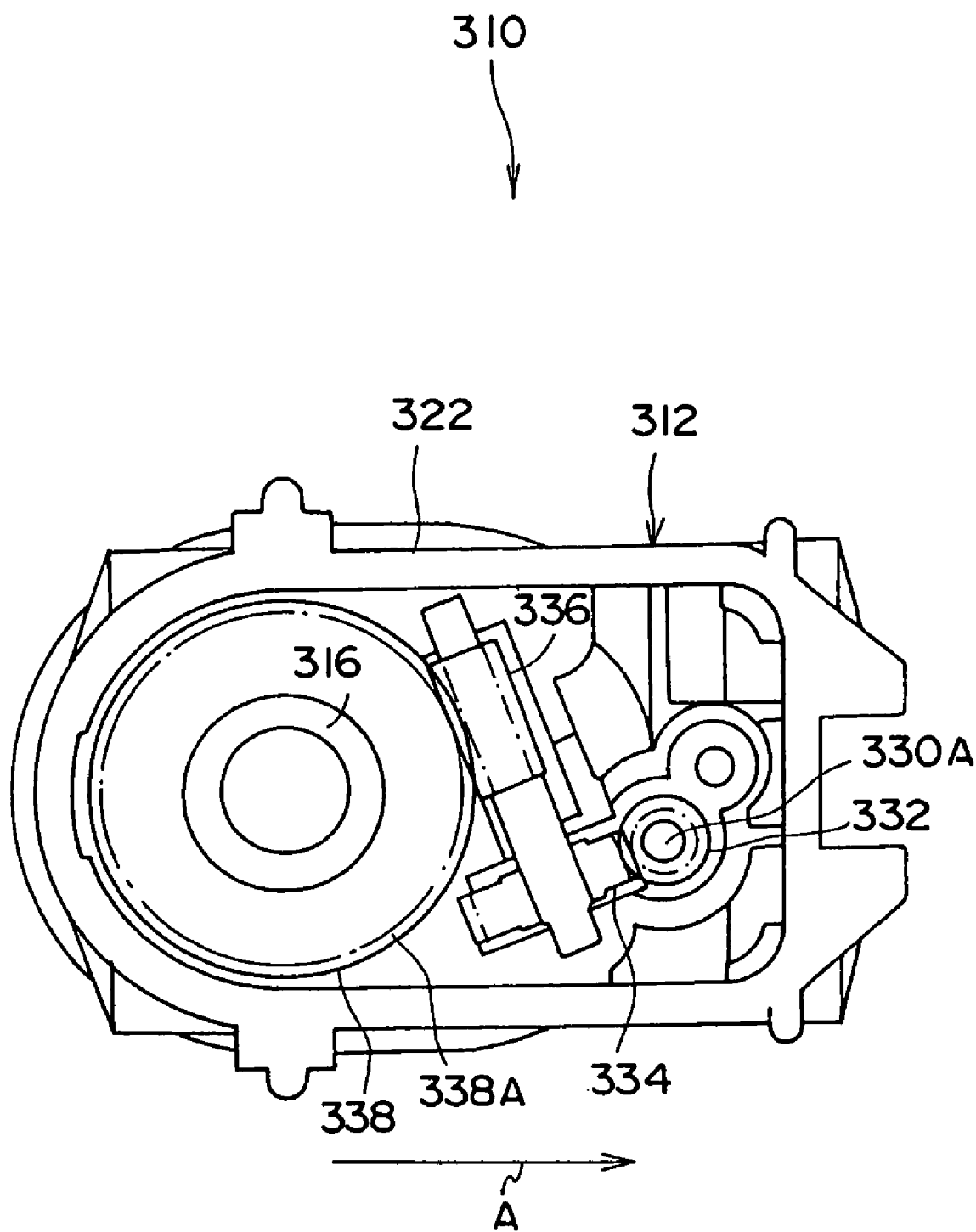
FIG. 15 is a plan sectional view of taken along line 15—15 of FIG. 12, of the housing mechanism according to the third embodiment of the present invention.

As shown in detail in FIG. 10, on the stand 314, there are a plurality of different circles (2 in the present embodiment). A plurality of stand concavities 318 (2 for each circle and thus a total of 4 in the present embodiment) are provided around a center which is at the support shaft 316. Both end portions of each stand concavity 318 project to the upper side (referred to as the case 322 side hereinafter), and, as shown in detail in FIG. 11, are formed as a concave screw surface (C), which corresponds to an upper surface of a portion of an imaginary helical body having a central axis (B) at the support shaft 316, to which portion a concave curvature is applied. In the present embodiment, the four stand concavities 318 are disposed in a peripheral direction of the support shaft 316 so as to alternate between the outside circle and the inside circle and at angles substantially at a 90° degree range with respect to the support shaft 316. Also, the two stand concavities 318 on each circle face each other, and stand convexities 320 which project upward are provided between the respective concavities 318 of each same circle.

Further, the housing mechanism 312 includes a substantially box-shaped case 322 and a case cover 321 which covers the case 322. The support shaft 316 is inserted through the case 322, and the case 322 is rotatably supported by the support shaft 316. The case 322 is connected to a mirror for viewing the rear direction of the vehicle (not shown) via a frame and a mirror surface adjusting mechanism, and the case 322 rotates integrally with the mirror about the support shaft 316.

A substantially ring-shaped detent plate 324 is integrally fixed to a bottom surface of a bottom wall of the case 322. The detent plate 324 has different circles (2 in the present embodiment). A plurality of case convexities 326 (2 on each circle and thus a total of 4 in the present embodiment), are provided on the different circles, around a center which is at the support shaft 316. Each case convexity 326 projects to the lower side (to the stand 314 side), and both end portions of each case convexity 326 are formed as convex screw surfaces with the support shaft 316 as the central axis thereof. In the present embodiment, the case convexities 326 are disposed in a circumferential direction around the support shaft 316 with angles with respect to the axis of the circle having a predetermined range, and alternating between the outside circle and the inside circle. Also, the two case convexities 326 on each circle face each other. In addition, case concavities 328 which project upwards are provided between the two case convexities 326 on each circle. Engagement is possible when one end portion of each of each case convexity 326 fits into one end portion of the corresponding stand concavity portion 318, and when the other end portion of each case convexity portion 326 fits into the other end portion of the corresponding stand concavity 318.

A motor 330 is housed and fixed at an inner portion of the case 322. A worm gear 332 is mounted on the drive shaft 330A of the motor 330, and a helical gear 334 meshes with the worm gear 332. The helical gear 334 is integrally provided with a shaft worm gear 336, and the helical gear 334 and the shaft worm gear 336 always rotate together.

A substantially cylindrical gear plate 338 through which the support shaft 316 is inserted so as to be rotatable is provided at the inner portion of the case 322. Peripheral teeth 338A are formed on the peripheral surface of the gear plate 338, and the gear plate 338 meshes with the shaft worm gear 336 at the peripheral teeth 338A. Thus, when the motor 330 is driven, a rotational force is applied to the gear plate 338 via the worm gear 332, the helical gear 334 and the shaft worm gear 336.

Figure 16:
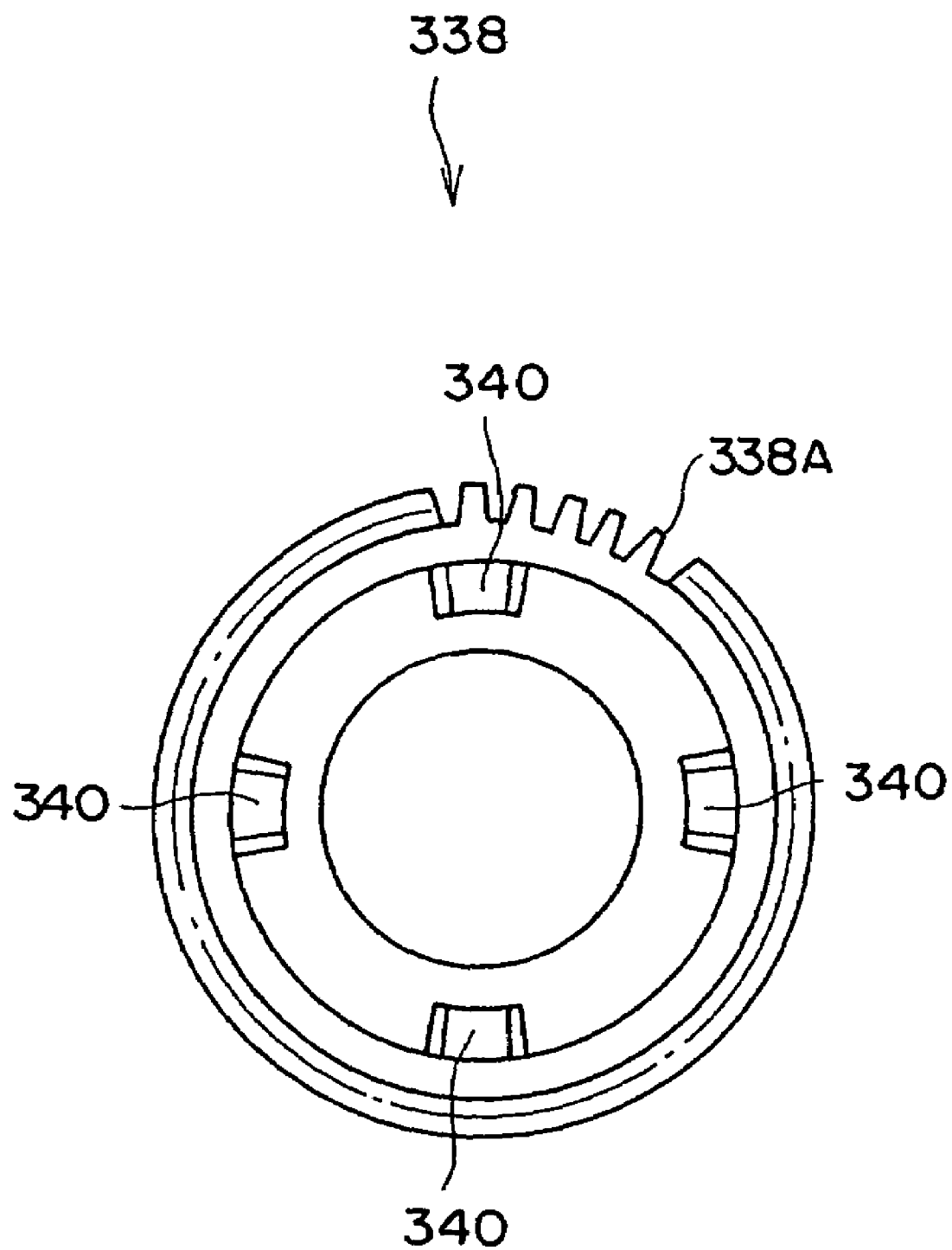
FIG. 16 is a plan view of a gear plate according to the third embodiment of the present invention.

As shown in detail in FIG. 16, a predetermined number (4 in the present embodiment) of insertion concavities 340 are formed on the upper surface of the gear plate 338, and the insertion concavities 340 are disposed so as to have equal intervals between them in a circumferential direction thereof. Both end portions of each of the insertion concavities 340 project to the upper side (referred to as a clutch plate 342 side hereinafter), and are formed as concave screw surfaces with the support shaft 316 at a helix central axis.

Figure 17:
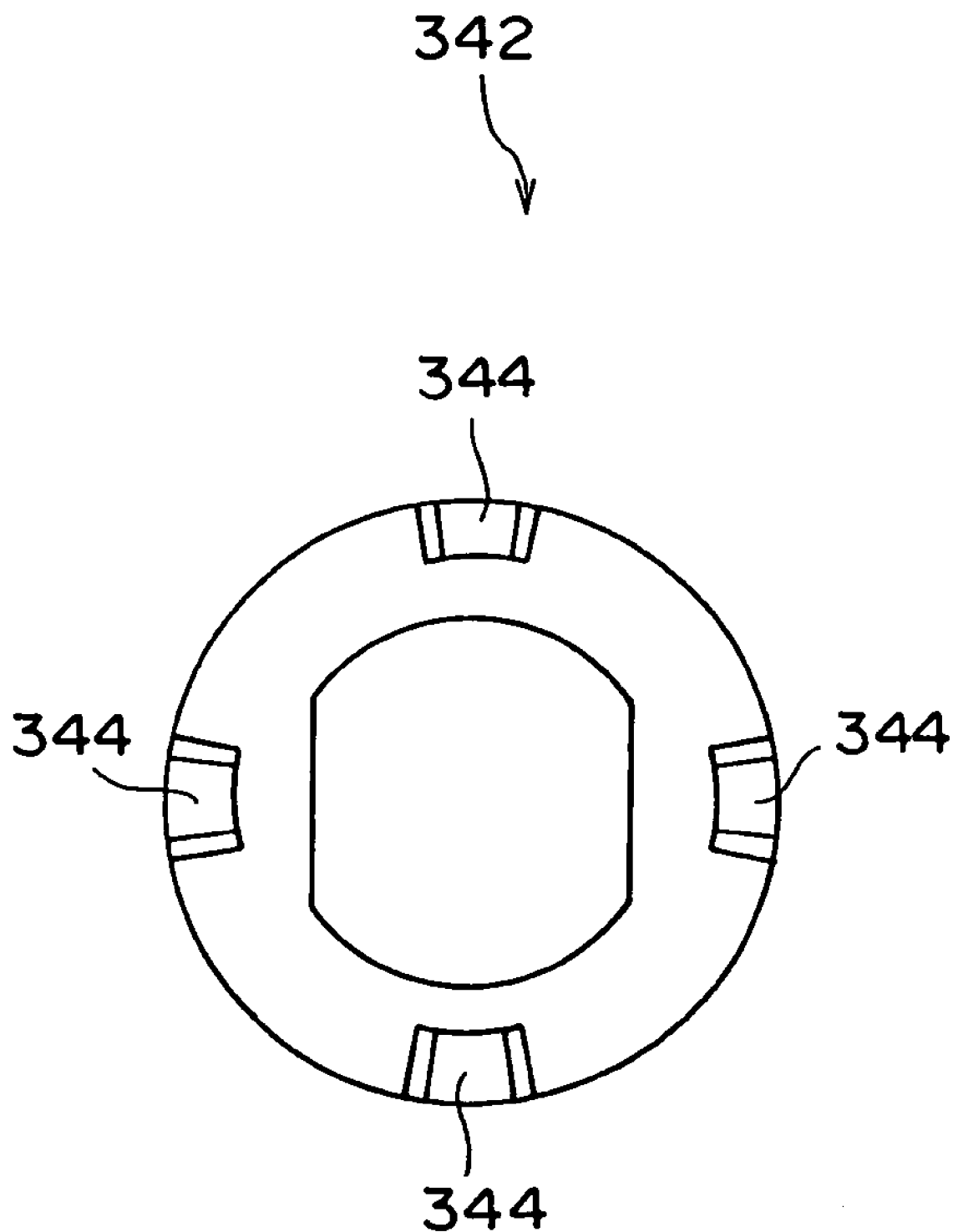
FIG. 17 is a back view of a cam plate according to the third embodiment of the present invention.

The substantially cylindrical clutch plate 342 is disposed above the gear plate 338. The clutch plate 342 is disposed around the support shaft 316 such that it cannot rotate relatively thereto. As shown in FIG. 17, a predetermined number (4 in the present embodiment) of insertion convexities 344 are formed on the lower surface of the clutch plate 342, and the insertion convexities 344 are disposed so as to have equal intervals between them in a circumferential direction thereof. Each of the insertion convexities 344 projects to the lower side (referred to as the gear plate 338 side hereinafter), and both end portions of each insertion convexity 344 are formed as a convex screw surface with the support shaft 316 at a helix central axis. Each of the insertion convexities 344 is inserted when both end portions thereof are fitted into one of the insertion concavities 340, and the clutch plate 342 is thereby engaged with the gear plate 338.

A compression coil spring 346 is disposed above the clutch plate 342, and the compression coil spring 346 is disposed around the support shaft 316. Push nuts 348, which are fixed to support shaft 316, are disposed above the compression spring coil 346. Thus, the compression spring coil 346 is anchored by the push nuts 348, and the gear plate 338 is urged (pressed down).

In addition, the frame, a holding member and the housing mechanism 312 are housed in a door mirror visor (not shown), and the door mirror visor is fixed to a frame.

When a rotational force is applied to the gear plate 338 by the motor 330 being driven, the clutch plate 342 blocks the rotation of the gear plate 338. As a result, the case 322 is caused to swing by the anti-rotational force that is applied to the gear plate 338, in a direction for housing or in a direction in which the case is brought out for viewing. Also, the other end portion of each case convexity 326 engages with the other end portion of each stand concavity 318, and causes the case 322 to be anchored and the mirror is stopped at the housed position, or one end portion of each case convexity 326 engages with one end portion of each stand concavity 318, to thereby cause the case 322 to be anchored and the mirror is stopped at the position at which it is brought out for viewing.

Further, when the door mirror visor receives an external force, and an external force exceeding a predetermined value acts on the case 322, the urging force of the compression coil spring 346 is resisted, the insertion convexities 344 and the insertion concavities 340 are disengaged, the clutch plate 342 and the gear plate 338 are disengaged, and the gear plate 338 rotates together with the case 322, with respect to the clutch plate 342.

The following is a description of the operation of the third embodiment.

In the door mirror device 310, the insertion convexities of the gear plate 338 are inserted into the insertion concavities 340 of the clutch plate 342 in a state in which the urging force of the compression coil spring 346 is being exerted, and thus the gear plate 342 is engaged with the gear plate 338.

When the motor 330 is driven, and a rotational force is applied to the gear plate 338 via the worm gear 332, the helical gear 334 and the shaft worm gear 336, the clutch plate 342 blocks the rotation of the gear plate 338, and thus the anti-rotational force which is applied to the gear plate 338 swings the case 322 in the direction for housing or in the direction for viewing.

The other end portion of each case convexity 326 engages with the other end portion of each stand concavity 318 and causes the case 322 to be anchored, and the mirror is stopped at the housed position, or the one end portion of each case convexity 326 engages with the one end portion of each stand concavity 318 to thereby cause the case 322 to be anchored, and the mirror is stopped at the position at which it is swung out for viewing.

Further, when an external force exceeding a predetermined value acts on the case 322, the urging force of the compression coil spring 346 is resisted, the insertion convexities 344 and the insertion concavities 340 are disengaged, the gear plate 338 is allowed to swing with respect to the clutch plate 342, and thus the gear plate 338 swings together with the case 322 to thereby avoid the impact of the force, and damage to the gear plate 338 is prevented.

Both end portions of the case convexities 326 and both end portions of the stand concavities 318 are formed as screw surfaces with the support shaft 316 being the central axis, and one end portion of each case convexity 326 and one end portion of each stand concavity 318 fit together, and also the other end portion of each case convexity 326 and the other end portion of each stand concavity 318 fit together. As a result, when one end portion of each case convexity 326 and one end portion of each stand concavity 318 are engaged, or the other end portion of each case convexity 326 and the other end portion of each stand concavity 318 are engaged, the case convexities 326 and the stand concavities 318 are always in good surface contact with each other. Thus, improvement of the durability of the case convexities 326 and the stand concavities 318 can be ensured, since wear thereof is favorably controlled.

Since 4 sets of the case convexities 326 and the stand concavities 318 are provided, when one end portion of each case convexity 326 and one end portion of each stand concavity 318 are engaged, or the other end portion of each case convexity 326 and the other end portion of each stand concavity 318 are engaged, the pressure that the case convexities 326 and the stand concavities 318 each receive is reduced and thus further improvement in the durability thereof can be ensured. In addition, in the state in which one end portion of each case convexity 326 and one end portion of each stand concavity 318 are engaged, or the other end portion of each case convexity 326 and the other end portion of each stand concavity 318 are engaged, rattling of the case 322 on the stand 314 is restrained, and thus rattling of the mirror is reduced.

Further, since the case convexities 326 and the stand convexities 318 are provided on each of a plurality of different circles having the support shaft 316 as a center, when one end portion of each case convexity 326 and one end portion of each stand concavity 318 are engaged, or the other end portion of each case convexity 326 and the other end portion of each stand concavity 318 are engaged, the pressure that the case convexities 326 and the stand concavities 318 each receive is decreased even further, and thus, improvement of the durability of the case convexities 326 and the stand concavities 318 can be further ensured. It should be noted that, in the present embodiment, the case convexities 326 and the stand concavities 318 are approximately three times more durable than those of the prior art. In addition, in a state in which one end portion of each case convexity 326 and one end portion of each stand concavity 318 are engaged, or the other end portion of each case convexity 326 and the other end portion of each stand concavity 318 are engaged, rattling of the case 322 on the stand 314 is further restrained, and thus rattling of the mirror is further reduced.

In addition, since both end portions of each insertion convexity 344 and both end portions of each insertion concavity 340 are formed as a convex screw surface with the support shaft 316 as the central axis, the insertion convexities 344 and insertion concavities 340 are engaged at both end portions thereof. As a result, when insertion convexities 344 and insertion concavities 340 are engaged or disengaged, or when the one end portions of the insertion convexities 344 and the one end portions of the insertion concavities 340 undulate, or when the other end portions of the insertion convexities 344 and the other end portions of the insertion concavities 340 undulate, the surfaces of the insertion convexities 344 and the insertion concavities 340 are always in favorable contact with each other. Thus, improvement of the durability of the insertion convexities 344 and the insertion concavities 340 can be ensured.

In this third embodiment, 4 sets of the case convexities 326 and stand concavities 318 are provided. However, the number of sets of case convexities and stand concavities can be any number not less than three.

In addition, the structure of this third embodiment is such that the end portions of the case convexities 326 are formed as convex screw surfaces, and the end portion of the stand concavities 318 is formed as concave screw surfaces. However, the structure may be such that the end portions of the case convexities are formed as concave screw surfaces, and the end portions of the stand concavities 318 are formed as convex screw surfaces.

Further, in the present embodiment, end portions of the case convexities 326 and end portions of the stand concavities 318 are formed as screw surfaces with the support shaft 316 at the central axis. However end portions of the case convexities and end portions of the stand concavities may be formed as inclined surfaces having an upper area and a lower area along the radial direction of the support shaft.

In addition, the structure of this third embodiment is such that the end portions of the insertion convexities 344 are formed as convex screw surfaces, and the end portions of the insertion concavities 340 are formed as concave screw surfaces. However, the structure may be such that the end portions of the insertion convexities 344 are formed as concave screw surfaces, and the end portions of the insertion concavities 340 are formed as convex screw surfaces.

Further, in the present embodiment, the insertion concavities 340 are provided on the gear plate 338, and insertion convexities 344 are provided on the clutch plate 342. However, insertion convexities may be provided on the gear plate, and insertion concavities on the clutch plate.

The present invention may also be applied to a fender mirror device for a vehicle.

What is claimed is:

1. An electrically powered folding mirror device for a vehicle, the mirror device comprising:
   a support shaft including a base portion;
   a case installed on the support shaft, the case including a fitting portion disposed around an outer periphery of the base portion of the support shaft;
   a mirror unit attached to the case and swingable around the support shaft, by rotation of the fitting portion around the support shaft, for positioning at positions including a viewing position and a folded position;
   a motor base attached inside the case;
   an electric motor mounted to the motor base and including a motor output shaft which penetrates the motor base;
   a transmission mechanism provided inside the case, operationally connected to the motor output shaft, and including a worm gear connected with the motor output shaft so as to be moveable in an axial direction of the motor output shaft but not rotatable relative to the motor output shaft, the transmission mechanism acting to swing the case and mirror unit when the motor is operated; and
   a control portion provided at a side of the motor base,
   wherein the case includes an inner bottom portion rotatably supporting a lower end portion of the worm gear, and an upper end portion of the worm gear is rotatably supported by the motor base, and said worm gear is captured between said inner bottom portion said motor base and restrained from moving in a perpendicular direction with respect to said motor output shaft by the control portion.

2. The mirror device of claim 1, further comprising a base which is mountable to a vehicle body and from which the support shaft stands.

3. The mirror device of claim 1, further comprising a structure for blocking rotation of the motor base with respect to the case.

4. The mirror device of claim 3 wherein the structure for blocking rotation includes at least one of: a combination of a fitting hole provided in the case and the control portion;

and a combination of a blocking hole provided in the case and a corresponding blocking projection provided at the motor base.

5. The mirror device of claim 1, wherein the transmission mechanism includes a helical gear rotatably supported inside the case, and the helical gear meshes with the worm gear.

6. The mirror device of claim 1, wherein the transmission mechanism includes a ring gear fixed to an outer peripheral surface of the support shaft.

7. The mirror device of claim 1, wherein said control portion is disposed at a portion of said motor base surrounding an output shaft of said electric motor.

8. The mirror device of claim 7, wherein said control portion is disposed between said output shaft surrounding portion of said motor base and a recessed base portion of said worm gear.

9. The mirror device of claim 8, wherein said control portion circumscribes said recessed base portion of said worm gear.

10. The mirror device of claim 9, wherein said control portion includes a substantially annular body that circumscribes said recessed base portion.

11. An electrically powered folding mirror device for a vehicle, the mirror device comprising:
    a support shaft including a base portion;
    a case installed on the support shaft, the case including a fitting portion disposed around an outer periphery of the base portion of the support shaft;
    a mirror unit attached to the case and swingable around the support shaft, by rotation of the fitting portion around the support shaft, for positioning at positions including a viewing position and a folded position;
    a motor base attached inside the case;
    an electric motor mounted to the motor base and including a motor output shaft which penetrates the motor base; and
    a transmission mechanism provided inside the case, operationally connected to the motor output shaft, and including a worm gear connected with the motor output shaft so as to be moveable in an axial direction of the motor output shaft but not rotatable relative to the motor output shaft, the transmission mechanism acting to swing the case and mirror unit when the motor is operated, and
    a structure for blocking rotation of the motor base with respect to the case including at least one of: a combination of a fitting hole provided in the case and a corresponding control portion provided at the motor base; and a combination of a blocking hole provided in the case and a corresponding blocking projection provided at the motor base.

* * * * *